United States Patent [19]
Shinkai et al.

[11] Patent Number: 5,776,656
[45] Date of Patent: Jul. 7, 1998

[54] OPTICAL RECORDING MEDIUM

[75] Inventors: Masahiro Shinkai, Chiba; Sumiko Kitagawa, Saitama; Kenryo Namba, Tokyo; Emiko Yoshimura, Chiba; Atsushi Monden, Chiba; Takahiko Suzuki, Chiba, all of Japan

[73] Assignee: TDK Corporation, Tokyo, Japan

[21] Appl. No.: 686,658

[22] Filed: Jul. 26, 1996

[30] Foreign Application Priority Data

| Jul. 28, 1995 | [JP] | Japan | 7-212343 |
| Nov. 8, 1995 | [JP] | Japan | 7-314844 |
| Jun. 6, 1996 | [JP] | Japan | 8-166885 |

[51] Int. Cl.$^6$ ............................................. G11B 7/24
[52] U.S. Cl. .................. 430/270.19; 430/270.15; 430/270.16; 430/270.2; 430/270.21; 430/945
[58] Field of Search ................ 430/270.15, 270.16, 430/270.19, 270.2, 270.21, 945

[56] References Cited

U.S. PATENT DOCUMENTS 4,767,696  8/1988  Ishimoto et al. ................ 430/270.2
5,633,106  5/1997  Aihara et al. ...................... 430/21

FOREIGN PATENT DOCUMENTS

| 2-9882A | 12/1990 | Japan . |
| 5-25179 (A) | 2/1993 | Japan . |
| 6-40161A | 2/1994 | Japan . |
| 6-40162A | 2/1994 | Japan . |
| 07052544A | 2/1995 | Japan . |
| 07101151A | 4/1995 | Japan . |

*Primary Examiner*—John A. McPherson
*Attorney, Agent, or Firm*—Watson Cole Grindle Watson, P.L.L.C.

[57] ABSTRACT

The invention provides an optical recording medium comprising at least two recording layers containing a dye. At least two layers of the recording layers have different optical constants, and at least one among these recording layers having different optical constants contains a dye which forms a thin film having an absorption spectrum whose half-value width is up to 170 nm. This construction permits the medium to be written and read in a conventional wavelength range of about 780 nm and a shorter wavelength range of about 630–680 nm.

10 Claims, 2 Drawing Sheets

OPTICAL RECORDING MEDIUM

BACKGROUND OF THE INVENTION

1. Field of the Invention

This invention relates to an optical recording medium having a dye film as a recording layer, and more particularly, to a write-once type optical recording disc capable of writing and reading at two wavelengths, a short wavelength (of about 630 nm to about 680 nm) as well as a conventional wavelength of about 780 nm.

2. Prior Art

In recent years, optical recording discs of the write-once, rewritable and other types have been of great interest as high capacity information carrying media. Among the optical recording discs, there are known those having a dye film composed mainly of a dye as the recording layer. Structurally classified, optical recording discs proposed thus far include widely used discs of the air-sandwich structure having an air space on a recording layer made of a dye film and discs of the close contact type having a reflective layer in close contact with a recording layer made of a dye film which can be read in accordance with the compact disc (CD) standard. (See Nikkei Electronics, Jan. 23, 1989, No. 465, page 107; the Functional Dye Department of the Kinki Chemical Society, Mar. 3, 1989, Osaka Science & Technology Center; and Proceedings SPIE—The International Society for Optical Engineering, Vol. 1078, pages 80–87, "Optical Data Storage Topical Meeting", 17–19, Jan. 1989, Los Angels.)

Recording layers for these discs are generally formed by using a dye coating solution and coating it.

To meet the recent increasing demand for higher density recording, attempts have been made to reduce the wavelength of laser light. For example, Japanese Patent Application Kokai (JP-A) Nos. 40161/1994 and 40162/1994 disclose optical recording media which utilize cyanine dyes for recording with a short wavelength laser.

As the research for writing and reading with a short wavelength laser steps forward, it becomes desirable to read the information which has been recorded at a conventional laser wavelength of about 780 nm by means of a reading equipment utilizing a short wavelength laser of about 630 nm to about 680 nm and vice versa. There arises a requirement to render writing/reading at the conventionally used wavelength interchangeable with writing/reading at a short wavelength.

The proposals of JP-A 40161/1994 and 40162/1994 can accommodate for short wavelength operation although writing/reading at the conventional wavelength of about 780 nm is impossible.

Also, JP-A 52544/1996 discloses an optical recording medium of a specific structure using a phthalocyanine dye. Allegedly, by changing the structure of a medium, that is, by employing an air-sandwich structure, writing/reading at a short wavelength becomes possible. By employing a structure having a reflecting layer in close contact, writing/reading at a wavelength of about 780 nm becomes possible.

The proposal of JP-A 52544/1996 requires to change the structure of a medium itself, but does not meet the demand to carry out writing/reading on the same medium at different wavelengths, a short wavelength and a long wavelength.

DISCLOSURE OF THE INVENTION

An object of the present invention is to provide an optical recording medium which is stable, can accommodate the Orange Book standard, and enables writing and reading at a short wavelength (of about 630 nm to about 680 nm).

This and other objects are achieved by the present invention which is defined below as (1) to (22).

(1) An optical recording medium comprising at least two recording layers containing a dye on a substrate and a reflective layer thereon, wherein at least two layers of said recording layers have different optical constants, and at least one among said recording layers having different optical constants contains a dye which forms a thin film having an absorption spectrum whose half-value width is up to 170 nm.

(2) The optical recording medium of (1) wherein among said recording layers having different optical constants, at least one layer contains a dye A having a complex index of refraction at 780 nm whose real part n is 1.8 to 2.8 and imaginary part k is up to 0.15 and forming a thin film having an absorption spectrum whose half-value width is up to 170 nm and at least one distinct layer contains a dye B having a complex index of refraction at 630 nm or 650 nm whose real part n is 1.8 to 2.8 and imaginary part k is up to 0.4.

(3) The optical recording medium of (2) wherein said substrate has a groove in the surface on which the recording layers are formed, a recording layer B containing dye B is formed on the substrate and a recording layer A containing dye A is formed on the recording layer B.

(4) The optical recording medium of (3) wherein the recording layers B and A have a thickness $t_B$ and $t_A$ in the groove, respectively, $t_A/t_B$ being in the range between 1 and 10.

(5) The optical recording medium of (4) wherein the thickness $t_B$ is 15 to 120 nm.

(6) The optical recording medium of (1) which is written with light having a wavelength of about 780 nm and read with light having a wavelength of about 630 to 680 nm and light having a wavelength of about 780 nm.

(7) The optical recording medium of (1) wherein said recording layers having different optical constants are formed by coating using immiscible solvents.

(8) The optical recording medium of (2) wherein said dye A is a phthalocyanine dye of the following formula (I):

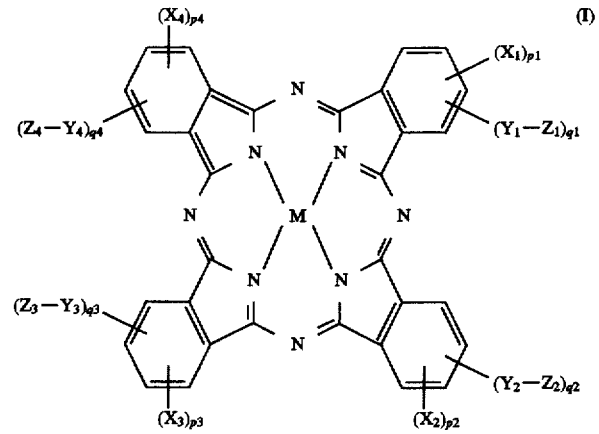

wherein M is a center atom, each of $X_1$, $X_2$, $X_3$, and $X_4$ which may be the same or different is a halogen atom, p1, p2, p3, and p4 each are 0 or an integer of 1 to 4, the sum of p1+p2+p3+p4 is 0 to 15, each of $Y_1$, $Y_2$, $Y_3$, and $Y_4$ which may be the same or different is an oxygen or sulfur atom, each of $Z_1$, $Z_2$, $Z_3$, and $Z_4$ which may be the same or different is selected from the group consisting of an alkyl radical, alicyclic hydrocarbon radical, aromatic hydrocarbon radical, and heterocyclic radical each having at least 4 carbon atoms, and q1, q2, q3, and q4 each are 0 or an integer of 1 to 4 and are not equal to 0 at the same time, the sum of q1+q2+q3+q4 is 1 to 8.

(9) The optical recording medium of (8) wherein the position at which each of $Y_1$, $Y_2$, $Y_3$, and $Y_4$ is attached to the phthalocyanine ring is the 3- and/or 6-position.

(10) The optical recording medium of (8) wherein each of $Z_1$, $Z_2$, $Z_3$, and $Z_4$ is an alicyclic hydrocarbon radical or aromatic hydrocarbon radical.

(11) The optical recording medium of (10) wherein the alicyclic hydrocarbon radical or aromatic hydrocarbon radical represented by each of $Z_1$, $Z_2$, $Z_3$, and $Z_4$ has a substituent at a position adjacent to its position of attachment to a corresponding one of $Y_1$, $Y_2$, $Y_3$, and $Y_4$.

(12) The optical recording medium of (2) wherein said dye B is a trimethinecyanine dye of the following formula (II):

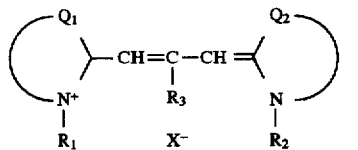

wherein each of $Q_1$ and $Q_2$ is a group of atoms necessary to complete a heterocyclic ring with the carbon and nitrogen atoms, the heterocyclic skeletons completed by $Q_1$ and $Q_2$ may be the same or different, each of $R_1$ and $R_2$ which may be the same or different is an aliphatic hydrocarbon radical, $R_3$ is a hydrogen atom or monovalent substituent, and $X^-$ is a monovalent anion.

(13) The optical recording medium of (12) wherein said dye B is a trimethineindolenine cyanine dye of the following formula (III):

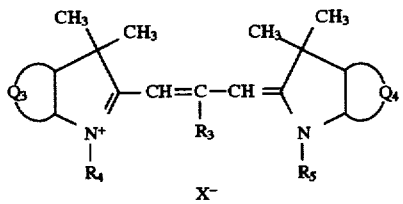

wherein each of $Q_3$ and $Q_4$ is a group of atoms necessary to complete an indolenine or benzoindolenine ring with the pyrrole ring, the rings completed by $Q_3$ and $Q_4$ may be the same or different, $R_3$ is a hydrogen atom or monovalent substituent, each of $R_4$ and $R_5$ is an alkyl radical, and $X^-$ is a monovalent anion.

(14) The optical recording medium of (13) wherein either one of the rings completed by $Q_3$ and $Q_4$ together with the pyrrole rings is an indolenine ring and the other is a benzoindolenine ring, and the benzene ring of the benzoindolenine ring is fused to the indolenine ring at the 4 and 5-positions thereof.

(15) The optical recording medium of (14) wherein the indolenine ring has a hydrogen atom, halogen atom or alkyl radical at the 5-position thereof.

(16) The optical recording medium of (13) wherein both the rings completed by $Q_3$ and $Q_4$ together with the pyrrole rings are benzoindolenine rings, and the benzene ring of each benzoindolenine ring is fused to the indolenine ring at the 4 and 5-positions thereof.

(17) The optical recording medium of (12) wherein a singlet oxygen quencher is used as a stabilizer along with said trimethinecyanine dye.

(18) The optical recording medium of (17) wherein said singlet oxygen quencher is a metal-containing azo compound of the following formula (IV):

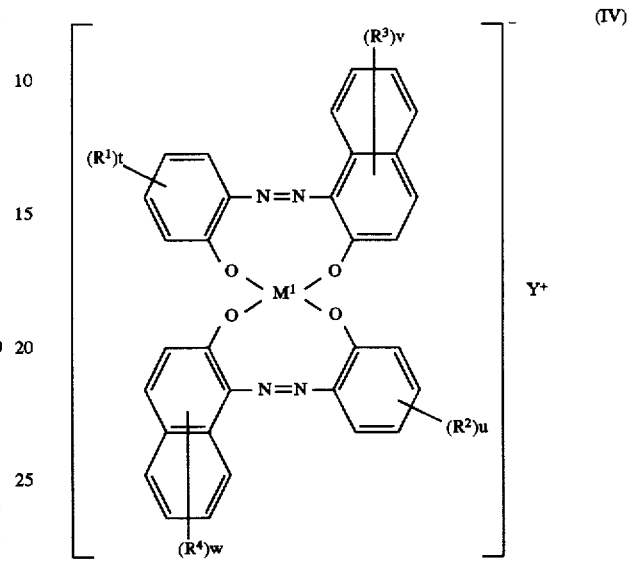

wherein each of $R^1$ and $R^2$ is selected from the group consisting of a nitro radical, halogen atom, amino radical, sulfamoyl radical, alkyl radical, and alkoxy radical, t and u each are 0 or an integer of 1 to 4, each of $R^3$ and $R^4$ is selected from the group consisting of a halogen atom, nitro radical, alkyl radical, alkoxy radical, and amino radical, v and w each are 0 or an integer of 1 to 6, $M^1$ is cobalt or nickel, and $Y^+$ is an alkyl-substituted ammonium ion, with the proviso that t, u, v and w are not equal to 0 at the same time, and the sum of t+u+v+w is 1 to 20.

(19) The optical recording medium of (18) wherein said trimethinecyanine dye and said metal-containing azo compound are mixed and the mixing ratio of said metal-containing azo compound to said trimethinecyanine dye is from 10/90 to 95/5 on a molar basis.

(20) The optical recording medium of (2) wherein said dye B is a sub-phthalocyanine boron complex of the following formula (V):

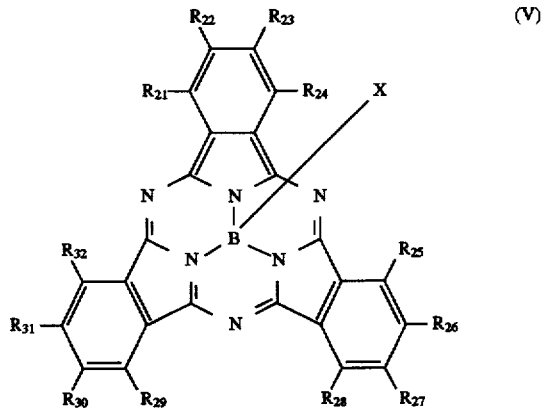

wherein each of $R_{21}$, $R_{22}$, $R_{23}$, $R_{24}$, $R_{25}$, $R_{26}$, $R_{27}$, $R_{28}$, $R_{29}$, $R_{30}$, $R_{31}$, and $R_{32}$, which may be the same or different, is selected from the group consisting of a hydrogen atom, halogen atom, alkyl, alkoxy, alkylthio, aryloxy, and arylthio radical, $R_{21}$ and $R_{22}$, $R_{22}$ and $R_{23}$, $R_{23}$ and $R_{24}$, $R_{25}$ and $R_{26}$, $R_{26}$ and $R_{27}$, $R_{27}$ and $R_{28}$, $R_{29}$ and $R_{30}$, $R_{30}$ and $R_{31}$ and $R_{31}$ and $R_{32}$, taken together, each may form a fused ring, and X is selected from the group consisting of a halogen atom, hydroxyl, alkoxy, phenoxy or phenyl radical, and the recording layer A is formed on the recording layer B with an intermediate layer interleaved therebetween.

(21) The optical recording medium of (20) wherein at least one of $R_{21}$ to $R_{32}$ is selected from the group consisting of a halogen atom, alkyl, alkoxy, alkylthio, aryloxy, and arylthio radical.

(22) The optical recording medium of (20) wherein at least one of $R_{21}$ to $R_{32}$ is selected from the group consisting of a branched alkyl radical, alkoxy radical having a branched alkyl radical, cyclohexyloxy radical having a normal or branched alkyl radical, and alkyl-substituted phenoxy radical.

FUNCTION

The optical recording medium of the invention has at least two recording layers containing a dye on a substrate. Included in the two or more recording layers are at least two layers having mutually different optical constants. Then the medium can be written and read at different wavelengths. Among the recording layers having different optical constants, at least one recording layer contains a dye which forms a thin film having an absorption spectrum whose half-value width is up to 170 nm. This avoids the interference of optical characteristics between the recording layers having different optical constants upon writing and reading at different wavelengths, ensuring satisfactory writing and reading.

When the recording layers having different optical constants are formed, they are formed using immiscible solvents, for example, a combination of a polar solvent and a nonpolar solvent. As a consequence, among the recording layers having different optical constants, there occurs no deterioration or dissolution of dye coatings. The interface between the recording layers is definite, that is, a uniform interface is formed, preventing noise generation and reflectance lowering.

More particularly, the preferred combination of dyes used in these recording layers is a dye A having a complex index of refraction at 780 nm whose real part n is 1.8 to 2.8 and imaginary part k is up to 0.15 and forming a dye thin film having an absorption spectrum whose half-value width is up to 170 nm and a dye B having a complex index of refraction at 630 nm or 650 nm whose real part n is 1.8 to 2.8 and imaginary part k is up to 0.4. In a wavelength band outside the above-mentioned range which is far apart from absorption, each of the dyes has an optical constant approximate to the optical constant of the substrate. Specifically, each dye has a complex index of refraction whose real part is 1.3 to 1.7 and imaginary part k is 0 to about 0.3.

The use of two dyes having such optical characteristics in respective recording layers enables satisfactory writing and reading at both the conventional wavelength of about 780 nm and a shorter wavelength region (of about 630 nm to about 680 nm).

More particularly, in a medium wherein a recording layer of dye B and a recording layer of dye A are stacked on a substrate in the described order, dye B has optical constants, n approximate to the refractive index of the substrate and k equal to 0 at a wavelength of about 780 nm which is apart from the absorption band. Then the characteristics of the medium at a wavelength of about 780 nm directly reflect on the optical characteristics of dye A. Consequently, at a wavelength of about 780 nm, the medium can satisfy the Orange Book standard requiring a reflectance of at least 65% and a modulation of at least 60%. At a wavelength of about 630 to 680 nm, dye A has a sharp absorption peak. Then dye A has a small value of k and a value of n approximate to the substrate at a wavelength of about 630 to 680 nm. However, since dye B has a complex index of refraction whose real part is 1.8 to 2.8 and imaginary part is up to 0.4 at 630 nm or 650 nm, the recording layer of dye A functions as an enhancement layer for improving the reflectance at a wavelength of about 630 to 680 nm. Then a reflectance of at least 20% is available at a wavelength of about 630 to 680 nm. Since the function as an enhancement layer varies depending on the order of stacking, the functions of the respective layers would be reversed if dyes having optical constants of the reverse order to the above-mentioned embodiment are used in the respective layers.

Furthermore, where the recording layer of dye A is thick, there is an occasion that a change induced by writing takes place only within that layer and the underlying layer of dye B is not affected at all. Then the medium develops very good writing characteristics at a wavelength of about 780 nm.

For the above-described reason, the optical recording medium of the invention is applicable to the recording layers corresponding to the CD standard and permits writing and reading with a short wavelength laser.

According to the invention, there is available an optical recording medium which can accommodate for two wavelengths in that it has a reflectance of at least 65%, a modulation of at least 60%, and an Rtop of at least 65% in the conventional wavelength region of about 780 nm, which values satisfy the Orange Book standards, while it allows for writing and reading in a shorter wavelength region (of about 630 nm to about 680 nm).

EMBODIMENTS OF THE INVENTION

Embodiments of the invention are described below in detail.

The optical recording medium of the invention has at least two recording layers on a substrate and a reflective layer on the recording layer. Among these recording layers, at least two layers have mutually different optical constants. Provided that layers having different optical constants are designated recording layers A and B, the recording layer A contains a dye A and the recording layer B contains a dye B.

Dye A has a complex index of refraction at 780 nm whose real part n is 1.8 to 2.8 and whose imaginary part (coefficient of extinction) k is up to 0.15, preferably 0.02 to 0.13. The use of a dye having such values of n and k provides for a satisfactory reflectance and signal modulation. In contrast, n of less than 1.8 results in a lower signal modulation and k in excess of 0.15 fails to provide a satisfactory reflectance. In fact, it is impossible to synthesize dyes with n in excess of 2.8.

It is noted that n and k of a dye is determined by preparing a test sample in which a dye film is formed on a given transparent substrate to a thickness equivalent to the recording layer of an optical recording medium, for example, of about 40 to 100 nm under the same conditions as used for the recording layer, measuring the test sample for reflectance and transmittance at 780 nm, and calculating n and k from these measurements according to Ishiguro Kozo, "Optics," Kyoritsu Publishing K.K., pages 168–178, for example. The reflectance is a reflectance of the test sample through the substrate or a reflectance of the sample from the dye film side while it is measured in a specular reflection mode (of the order of 5°).

Figure 1:
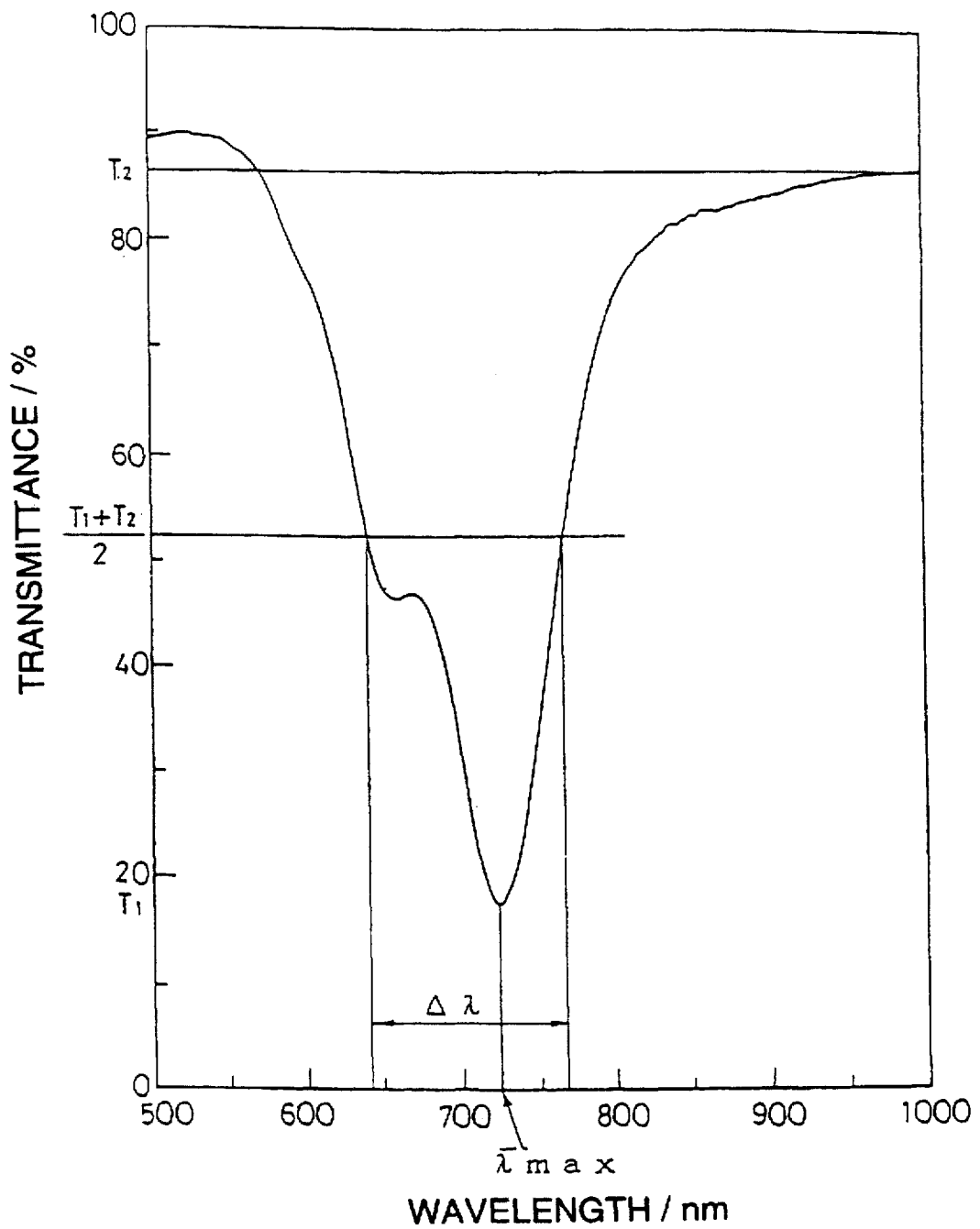
FIG. 1 is a graph for explaining how to determine the half-value width from an absorption spectrum of a thin film of a phthalocyanine dye in the practice of the invention.

Additionally, when an absorption spectrum of a dye thin film is measured, dye A exhibits an absorption maximum (λmax) at about 680 to 750 nm. The half-value width of the absorption spectrum, that is, the half-value width of a spectral line near λmax is up to 170 nm, preferably up to 150 nm. The lower limit of the half-value width is generally 50 nm though not critical. The use of a dye having such a half-value width eliminates any influence on the absorption characteristics of dye B so that a satisfactory reflectance and modulation in a short wavelength region are available. In contrast, if the half-value width exceeds 170 nm, the absorption edge overlaps the wavelength region of a short wavelength laser, causing a loss of reflectance in the short wavelength region. It is noted that the half-value width is determined by preparing a sample in which a dye film is formed on a transparent substrate such that the transmittance T at absorption maximum λmax is up to 25%, and measuring an absorption spectrum of the sample. Referring to the absorption spectrum of FIG. 1, for example, a transmittance T1 at λmax and a transmittance T2 which is substantially constant when the wavelength is shifted toward a longer wavelength side, that is, does not depend on a shift of wavelength are determined. The width Δλ at one-half of the bottom depth measured from T2 as a base to T1 is the half-value width. The dye film as the sample is generally about 50 to 150 nm thick.

On the other hand, dye B used in combination with dye A has a complex index of refraction at 630 nm or 650 nm whose real part n is 1.8 to 2.8 and whose imaginary part k is up to 0.4, preferably up to 0.2, more preferably 0 to 0.15. The use of a dye having such values of n and k provides for a satisfactory reflectance and signal modulation. In contrast, n of less than 1.8 results in a lower signal modulation and k in excess of 0.4 fails to provide a satisfactory reflectance. In fact, it is impossible to synthesize dyes with n in excess of 2.8. Herein, n and k are determined by the same procedure as used for dye A except that the measurement wavelength is 630 nm or 650 nm. Additionally, when an absorption spectrum of a dye thin film is measured, dye B exhibits an absorption maximum (λmax) at 650 nm or shorter, especially about 500 to 650 nm.

The order of stacking the recording layers A and B is not critical and may be properly selected.

The thickness of the recording layers A and B varies with the order of stacking and other factors although in most cases, the thickness is preferably about 10 to about 250 nm (100 to 2,500 Å) on the average. The total thickness is preferably about 60 to 350 nm (600 to 3,500 Å) on the average. In particular, the layers in grooves preferably have a thickness of about 15 to 300 nm (150 to 3,000 Å) singly and a total thickness of about 75 to 400 nm (750 to 4,000 Å).

A layered structure of recording layers allows writing/reading to be done at two wavelengths, a short wavelength and a conventional wavelength or writing and reading to be separately done at the two wavelengths.

Especially for the intended application wherein writing is done at a conventional wavelength of about 780 nm and reading is done at both a wavelength of about 780 nm and a short wavelength of about 630 to 680 nm, it is preferred to form the recording layer B on the substrate as a first recording layer and stack the recording layer A thereon as a second recording layer.

This order of stacking ensures satisfactory writing and reading because at the conventional wavelength of about 780 nm, the characteristics of dye A in the recording layer A are not adversely affected by dye B in the recording layer B as previously mentioned, and there is a tendency that sensitivity is rather improved. Satisfactory reading is ensured at the short wavelength of about 630 to 680 nm, on the other hand, because the recording layer A functions as an enhancement layer with respect to the recording layer B, improving the reflectance of the recording layer B.

In this embodiment, the recording layer B preferably has a thickness of 10 to 100 nm (100 to 1,000 Å), more preferably 10 to 65 nm (100 to 650 Å) on the average. In particular, the recording layer B preferably has a thickness $t_B$ in a groove (see FIG. 2) of 15 to 120 nm (150 to 1,200 Å), more preferably 15 to 80 nm (150 to 800 Å). On the other hand, the recording layer A preferably has a thickness of 50 to 250 nm (500 to 2,500 Å) on the average, and in particular, a thickness $t_A$ in a groove of 60 to 300 nm (600 to 3,000 Å). The total thickness of both the layers is preferably 60 to 350 nm (600 to 3,500 Å) on the average, and in particular, the total thickness ($t_A+t_B$) in a groove is preferably 75 to 400 nm (750 to 4,000 Å).

A choice of thickness in these ranges ensures satisfactory writing and reading.

The ratio in thickness of the recording layer A to the recording layer B, that is, recording layer A/recording layer B is preferably such that $t_A/t_B$ is from about 1 to about 20, more preferably from 1 to 10, most preferably from 1.5 to 6 when the thicknesses are represented by in-groove thicknesses $t_A$ and $t_B$.

A choice of such a thickness ratio leads to high write sensitivity at the conventional wavelength of about 780 nm and satisfactory read characteristics such as reflectance (Rtop) and modulation (IllMod) at both the conventional wavelength and the short wavelength. In contrast, a smaller ratio tends to invite poor jitter and an increased error count at the conventional wavelength of about 780 nm. A larger ratio disables reading at the short wavelength.

It is understood that in the foregoing description, reference is mostly made to the dual layer structure of recording layers. When the coating step is taken into account, the dual layer structure is preferred and the dual layer structure is rather sufficient. However, the invention is not limited thereto. Various structures are contemplated wherein, for example, a plurality of recording layers A containing dye A and a plurality of recording layers B containing dye B are provided such that a stack of recording layers A and a stack of recording layers B are placed one on top of the other or the recording layers A and recording layers B are alternately stacked.

With respect to n and k, the layered structure of recording layers has n=1.8 to 2.3 and k=0.03 to 0.20 at 630 nm or 650 nm and n=1.8 to 2.5 and k=0.03 to 0.15 at 780 nm, which suggests the possibility of effective writing and reading at a wavelength of about 630 nm or 650 nm and a wavelength of about 780 nm. These values of n and k are determined by the same procedure as those of the dye film mentioned above.

Further, n and k of the recording layer A are in the same range as dye A while n and k of the recording layer B are in the same range as dye B. The half-value width of absorption spectrum of the recording layer A is also up to 170 nm. It is noted that for dye A in the recording layer A and dye B in the recording layer B, dyes may be used alone or in admixture of two or more. When a mixture of dyes is used, it is acceptable that the ranges of n and k defined for dye A or B or recording layer A or B according to the invention are met when they are mixed.

It is understood that the two wavelengths used herein are a wavelength in the short wavelength region of generally 500 to 680 nm, specifically 580 to 680 nm, especially 630 to 680 nm and a wavelength in a long wavelength region of 770 to 900 nm, especially about 780 nm.

For dye A, it is preferred to use a dye which has so significant steric hindrance that association of molecules might be retarded when a thin film is formed. This is because a thin film of a dye whose molecules are unlikely to associate tends to exhibit an absorption spectrum having a smaller half-value width. Also such a dye is increased in solubility in preparing a dye-containing coating solution.

More specifically, dye A is preferably selected from phthalocyanine dyes, naphthalocyanine dyes, etc., with the phthalocyanine dyes being more preferred. Especially preferred is a phthalocyanine dye of the formula (I):

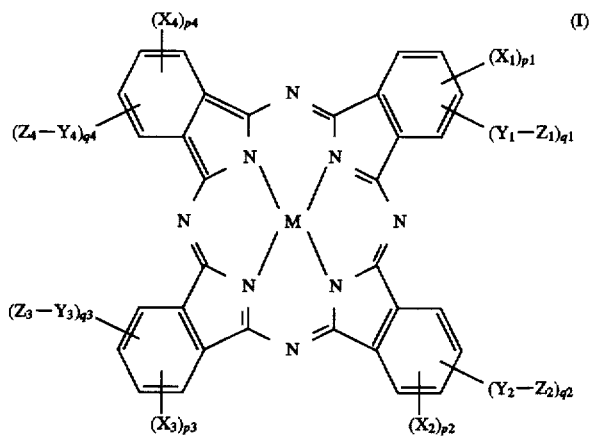

Formula (I) is described. In formula (I), M is a center atom. Included in the center atom represented by M are a hydrogen atom (2H) or a metal atom. Examples of the metal atom used herein are those in Groups 1 to 14 of the Periodic Table (Groups 1A to 7A, 8, and 1B to 4B). For example, mention is made of Li, Na, K, Mg, Ca, Ba, Ti, Zr, V, Nb, Ta, Cr, Mo, W, Mn, Tc, Fe, Co, Ni, Ru, Rh, Pd, Os, Ir, Pt, Cu, Ag, Au, Zn, Cd, Hg, Al, In, Tl, Si, Ge, Sn and Pb, more specifically, Li, Na, K, Mg, Ca, Ba, Ti, Zr, V, Nb, Ta, Cr, Mo, W, Mn, Tc, Fe, Co, Ni, Ru, Rh, Pd, Os, Ir, Pt, Cu, Ag, Au, Cd, Hg, Al, In, Tl, Si, Ge, Sn, and Pb. Preferred among these are Al, Si, Ge, Sn, Cu, Pd, Ni, Fe, and Co, especially Cu, Pd, Ni, Fe, Co, and VO for aging stability.

It is understood that these metal atoms, for instance, V may take the form of VO. Alternatively, the metal atom may have a ligand or ligands such as ether groups, ester groups, pyridine and derivatives thereof coordinated to the upper and/or lower sides or one lateral side, as in the case of Si, Al, Ge, Co, and Fe.

Each of $X_1$ to $X_4$ is a halogen atom, for example, F, Cl, Br, and I. Br and F are especially preferred.

Each of p1, p2, p3, and p4 is 0 or an integer of 1 to 4, and the sum of p1+p2+p3+p4 is 0 to 15, preferably 0 to 10.

$X_1$ to $X_4$ may be the same or different. Where each of p1, p2, p3, and p4 is an integer of 2 or more, $X_1$ radicals, $X_2$ radicals, $X_3$ radicals or $X_4$ radicals may be the same or different.

Each of $Y_1$ to $Y_4$ is an oxygen or sulfur atom, with the oxygen atom being especially preferred. $Y_1$ to $Y_4$ are generally the same though they may be different. Each of $Z_1$ to $Z_4$ is an alkyl radical, alicyclic hydrocarbon radical, aromatic hydrocarbon radical or heterocyclic radical each having at least 4 carbon atoms, and they may be the same or different.

Each of q1, q2, q3, and q4 is 0 or an integer of 1 to 4, they are not equal to 0 at the same time, and the sum of q1+q2+q3+q4 is 1 to 8, preferably 2 to 6.

The position at which $Y_1$ to $Y_4$ are attached to the phthalocyanine ring is preferably the 3- and/or 6-position of the phthalocyanine ring (as seen from the structural formula shown below), and the inclusion of at least one such bond is preferred.

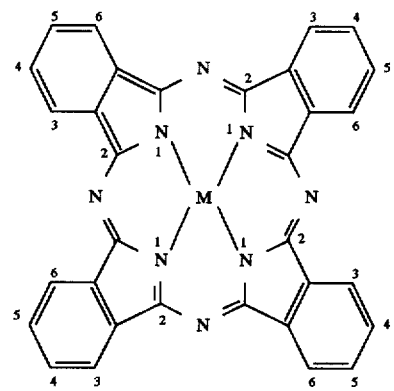

The alkyl radicals represented by $Z_1$ to $Z_4$ are preferably those having 4 to 16 carbon atoms. These alkyl radicals may be either normal or branched although the branched ones are preferred. The alkyl radicals may have a substituent which is a halogen atom (such as F, Cl, Br, and I, especially F and Br), etc. Examples of the alkyl radical include n-$C_4H_9$—, i-$C_4H_9$—, s-$C_4H_9$—, t-$C_4H_9$—, n-$C_5H_{11}$—, $(CH_3)_2CHCH_2CH_2$—, $(CH_3)_3CCH_2$—, $(C_2H_5)_2CH$—, $C_2H_5C(CH_3)_2$—, n-$C_3H_7CH(CH_3)$—, n-$C_6H_{13}$—, $(CH_3)_2CHCH_2CH_2CH_2$—, $(CH_3)_3C$—$CH_2$—$CH_2$—, n-$C_3H_7CH(CH_3)CH_2$—, n-$C_4H_9CH(CH_3)$—, n-$C_7H_{15}$—, [$(CH_3)_2CH]_2$—CH—, n-$C_4H_9CH(CH_3)CH_2$—, $(CH_3)_2CHCH_2CH(CH_3)CH_2$—, n-$C_8H_{17}$—, $(CH_3)_3CCH_2CH(CH_3)CH_2$—, $(CH_3)_2CHCH(i-C_4H_9)$—, n-$C_4H_9CH(C_2H_5)CH_2$—, n-$C_9H_{19}$—, $CH_3CH_2CH(CH_3)CH_2CH(CH_3)CH_2CH_2$—, $(CH_3)_2CHCH_2CH_2CH(CH_3)CH_2$—, n-$C_3H_7CH(CH_3)CH_2CH(CH_3)CH_2$—, n-$C_{10}H_{21}$—, $(CH_3)_3CCH_2CH_2C(CH_3)_2CH_2$—, n-$C_{11}H_{23}$—, n-$C_{12}H_{25}$—, n-$C_{13}H_{27}$—, n-$C_{14}H_{29}$—, n-$C_{15}H_{31}$—, n-$C_{16}H_{33}$—, n-$C_4F_9$—, i-$C_4F_9$—, s-$C_4F_9$—, and t-$C_4F_9$—.

The alicyclic hydrocarbon radicals represented by $Z_1$ to $Z_4$ include cyclohexyl, cyclopentyl and other radicals, with the cyclohexyl radical being preferred. These radicals may have a substituent which includes an alkyl radical, aryl radical, alkoxy radical, aryloxy radical, aralkyl radical, halogen atom, nitro radical, carboxyl radical, ester radical, acyl radical, amino radical, amide radical, carbamoyl radical, sulfonyl radical, sulfamoyl radical, sulfo radical, sulfino radical, arylazo radical, alkylthio radical, and arylthio radical. Preferred substituents are alkyl radicals having 1 to 5 carbon atoms (e.g., methyl, ethyl, n-propyl, iso-propyl, n-butyl, iso-butyl, sec-butyl, tert-butyl, n-pentyl, iso-pentyl, neo-pentyl, tert-pentyl, and 1-methylbutyl radicals), alkoxy radicals (e.g., methoxy, ethoxy, propoxy, isopropoxy, butoxy, isobutoxy, sec-butoxy, and tert-butoxy radicals), aryl radicals (e.g., phenyl, tolyl, biphenyl and naphthyl radicals), and halogen atoms (e.g., F, Cl, Br, and I, with F and Br being preferred). The replacement position of these substituents is preferably either one or both of the positions adjacent to the position of attachment to each of $Y_1$ to $Y_4$. The inclusion of at least one such substitution is preferred.

The aromatic hydrocarbon radicals represented by $Z_1$ to $Z_4$ may be a single ring or have a fused ring and may have a substituent. The total number of carbon atoms is preferably 6 to 20. Examples are phenyl and naphthyl radicals, with the phenyl radical being preferred. They may have a substituent while examples and preferred examples of the substituent are the same as exemplified for the alicyclic hydrocarbon radicals. The replacement position is also the same as previous, preferably ortho-position to the position of attachment to each of $Y_1$ to $Y_4$. The inclusion of at least one ortho-substitution is preferred.

The heterocyclic radicals represented by $Z_1$ to $Z_4$ may be a single ring or have a fused ring while the preferred hetero-atom is oxygen, nitrogen, sulfur, etc., with oxygen and nitrogen being especially preferred. Exemplary radicals include pyridyl, furanonyl, pyrazyl, pyrazolidyl, piperidinonyl, quinoxalyl, pyranonyl and thiophenetrionyl radicals, with the pyridyl and 2-furanonyl radicals being preferred. These heterocyclic radicals may further have a substituent while examples and preferred examples of the substituent are the same as exemplified for the alicyclic hydrocarbon and aromatic hydrocarbon radicals. Where there is a carbon atom adjacent to the position of attachment to each of $Y_1$ to $Y_4$, it is preferred to have a substituent at such an adjacent position.

Preferred for $Z_1$ to $Z_4$ are alicyclic hydrocarbon and aromatic hydrocarbon radicals, with cyclohexyl and phenyl radicals being especially preferred, while it is preferred to have a substituent (especially the preferred substituents mentioned above) at one or both of the positions adjacent to the position of attachment to each of $Y_1$ to $Y_4$.

Illustrative examples of the phthalocyanine dye are shown below although the invention is not limited thereto. These illustrative examples are shown in terms of $X_{11}$ to $X_{14}$, $X_{15}$ to $X_{18}$, $X_{19}$ to $X_{22}$, $X_{23}$ to $X_{26}$ and M in the following formula (Ia). Where all of $X_{11}$ to $X_{14}$ etc. are hydrogen, it is shown by "H." Where any of $X_{11}$ to $X_{14}$ has a substituent, only the substituted one is shown, with the expression "H" being omitted. It is understood that the 3 and 6-positions and the 4 and 5-positions of the phthalocyanine ring are equivalent to each other and where a substituent is present at either one of these positions, only one is shown as a representative example.

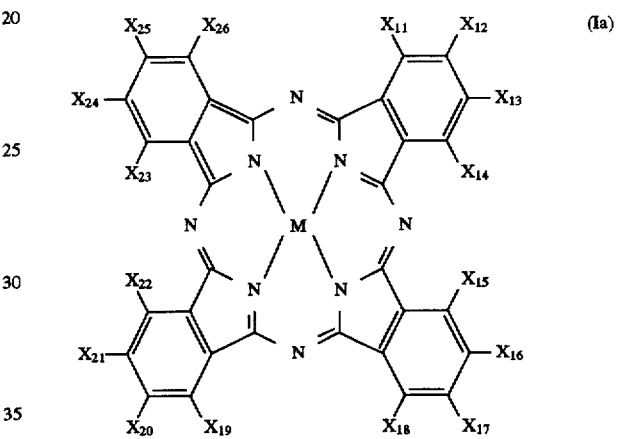

(Ia)

| Dye No. | $X_{11}$–$X_{14}$ | $X_{15}$–$X_{18}$ | $X_{19}$–$X_{22}$ | $X_{23}$–$X_{26}$ | M |
|---|---|---|---|---|---|
| A-1 | $X_{11}$=—O— (2,4-di-t-butylphenoxy) | $X_{15}$=—O— (2,4-di-t-butylphenoxy) | $X_{19}$=—O— (2,4-di-t-butylphenoxy) | $X_{23}$=—O— (2,4-di-t-butylphenoxy) | Cu |
| A-2 | $X_{11}$=—O—CH(CH(CH$_3$)$_2$)$_2$ | $X_{15}$=—O—CH(CH(CH$_3$)$_2$)$_2$ | $X_{19}$=—O—CH(CH(CH$_3$)$_2$)$_2$ | $X_{23}$=—O—CH(CH(CH$_3$)$_2$)$_2$ | Pd |
| A-3 | $X_{11}$=—O— (2-t-butylcyclohexyloxy) | $X_{15}$=—O— (2-t-butylcyclohexyloxy) | $X_{19}$=—O— (2-t-butylcyclohexyloxy) | $X_{23}$=—O— (2-t-butylcyclohexyloxy) | Cu |
| A-4 | $X_{11}$=—O— (2-t-butylphenoxy) | $X_{15}$=—O— (2-t-butylphenoxy) | $X_{19}$=—O— (2-t-butylphenoxy) | $X_{23}$=—O— (2-t-butylphenoxy) | Cu |
| A-5 | $X_{11}$=—O— (2-sec-butylphenoxy) | $X_{15}$=—O— (2-sec-butylphenoxy) | $X_{19}$=—O— (2-sec-butylphenoxy) | $X_{23}$=—O— (2-sec-butylphenoxy) | Cu |
| A-6 | $X_{11}$=—O— (2-methylphenoxy) | $X_{15}$=—O— (2-methylphenoxy) | $X_{19}$=—O— (2-methylphenoxy) | $X_{23}$=—O— (2-methylphenoxy) | Cu |
| A-7 | $X_{11}$=—O— (2,6-dimethylphenoxy) | $X_{15}$=—O— (2,6-dimethylphenoxy) | $X_{19}$=—O— (2,6-dimethylphenoxy) | $X_{23}$=—O— (2,6-dimethylphenoxy) | Cu |

-continued

| Dye No. | $X_{11}$–$X_{14}$ | $X_{15}$–$X_{18}$ | $X_{19}$–$X_{22}$ | $X_{23}$–$X_{26}$ | M |
|---|---|---|---|---|---|
| A-8 | $X_{11}$=—O—, 2-CH$_3$, 6-CH(CH$_3$)$_2$ phenyl | $X_{15}$=—O—, 2-CH$_3$, 6-CH(CH$_3$)$_2$ phenyl | $X_{19}$=—O—, 2-CH$_3$, 6-CH(CH$_3$)$_2$ phenyl | $X_{23}$=—O—, 2-CH$_3$, 6-CH(CH$_3$)$_2$ phenyl | Cu |
| A-9 | $X_{11}$=—O—, 2-Ph phenyl | $X_{15}$=—O—, 2-Ph phenyl | $X_{19}$=—O—, 2-Ph phenyl | $X_{23}$=—O—, 2-Ph phenyl | Cu |
| A-10 | $X_{11}$=—O—, 2-CF$_3$ phenyl | $X_{15}$=—O—, 2-CF$_3$ phenyl | $X_{19}$=—O—, 2-CF$_3$ phenyl | $X_{23}$=—O—, 2-CF$_3$ phenyl | Cu |
| A-11 | $X_{11}$=—O—, 2-Br phenyl | $X_{15}$=—O—, 2-Br phenyl | $X_{19}$=—O—, 2-Br phenyl | $X_{23}$=—O—, 2-Br phenyl | Cu |
| A-12 | $X_{11}$=—O—, 2-C(CH$_3$)$_3$, 5-F, 6-F phenyl | $X_{15}$=—O—, 2-C(CH$_3$)$_3$, 5-F, 6-F phenyl | $X_{19}$=—O—, 2-C(CH$_3$)$_3$, 5-F, 6-F phenyl | $X_{23}$=—O—, 2-C(CH$_3$)$_3$, 5-F, 6-F phenyl | Cu |
| A-13 | $X_{11}$=—O—, 2-C(CH$_3$)$_3$ phenyl; $X_{12}=X_{13}=X_{14}=$Br | $X_{15}$=—O—, 2-C(CH$_3$)$_3$ phenyl; $X_{16}=X_{17}=X_{18}=$Br | $X_{19}$=—O—, 2-C(CH$_3$)$_3$ phenyl; $X_{20}=X_{21}=X_{22}=$Br | $X_{23}$=—O—, 2-C(CH$_3$)$_3$ phenyl; $X_{24}=X_{25}=X_{26}=$Br | Cu |

-continued

| Dye No. | $X_{11}$–$X_{14}$ | $X_{15}$–$X_{18}$ | $X_{19}$–$X_{22}$ | $X_{23}$–$X_{26}$ | M |
|---|---|---|---|---|---|
| A-14 | $X_{11}=X_{14}=-O-$ (phenyl with Ph); $X_{12}=X_{13}=F$ | $X_{15}=X_{18}=-O-$ (phenyl with Ph); $X_{16}=X_{17}=F$ | $X_{19}=X_{22}=-O-$ (phenyl with Ph); $X_{20}=X_{21}=F$ | $X_{23}=X_{26}=-O-$ (phenyl with Ph); $X_{24}=X_{25}=F$ | Cu |
| A-15 | $X_{11}=-O-$ (phenyl with $C(CH_3)_3$) | H | H | H | Cu |
| A-16 | $X_{11}=X_{14}=-O-$ (phenyl with $C(CH_3)_3$) | H | $X_{19}=-O-$ (phenyl with $C(CH_3)_3$) | $X_{23}=X_{26}=-O-$ (phenyl with $C(CH_3)_3$) | Cu |
| A-17 | $X_{11}=X_{14}=-O-$ (phenyl with $C(CH_3)_3$) | H | $X_{19}=X_{22}=-O-$ (phenyl with $C(CH_3)_3$) | H | Cu |
| A-18 | $X_{11}=-S-$ (phenyl with $C(CH_3)_3$) | $X_{15}=-O-$ (phenyl with $C(CH_3)_3$) | $X_{19}=-O-$ (phenyl with $C(CH_3)_3$) | $X_{23}=-O-$ (phenyl with $C(CH_3)_3$) | Cu |
| A-19 | $X_{11}=-O-$ (phenyl with $CH_3$ and $C(CH_3)_3$) | $X_{15}=-O-$ (phenyl with $CH_3$ and $C(CH_3)_3$) | $X_{19}=-O-$ (phenyl with $CH_3$ and $C(CH_3)_3$) | $X_{23}=-O-$ (phenyl with $CH_3$ and $C(CH_3)_3$) | Pd |

-continued

| Dye No. | $X_{11}-X_{14}$ | $X_{15}-X_{18}$ | $X_{19}-X_{22}$ | $X_{23}-X_{26}$ | M |
|---|---|---|---|---|---|
| A-20 | 2-methyl-6-tert-butylphenoxy | 2-methyl-6-tert-butylphenoxy | 2-methyl-6-tert-butylphenoxy | 2-methyl-6-tert-butylphenoxy | Ni |
| A-21 | 2-methyl-6-tert-butylphenoxy | 2-methyl-6-tert-butylphenoxy | 2-methyl-6-tert-butylphenoxy | 2-methyl-6-tert-butylphenoxy | Fe |
| A-22 | 2-methyl-6-tert-butylphenoxy | 2-methyl-6-tert-butylphenoxy | 2-methyl-6-tert-butylphenoxy | 2-methyl-6-tert-butylphenoxy | Co |
| A-23 | 2-methyl-6-tert-butylphenoxy | 2-methyl-6-tert-butylphenoxy | 2-methyl-6-tert-butylphenoxy | 2-methyl-6-tert-butylphenoxy | VO |
| A-24 | 2,4-di-tert-butylcyclohexyloxy | 2,4-di-tert-butylcyclohexyloxy | 2,4-di-tert-butylcyclohexyloxy | 2,4-di-tert-butylcyclohexyloxy | Cu |
| A-25 | 2-(sec-butyl)cyclohexyloxy | 2-(sec-butyl)cyclohexyloxy | 2-(sec-butyl)cyclohexyloxy | 2-(sec-butyl)cyclohexyloxy | Cu |

| Dye No. | $X_{11}-X_{14}$ | $X_{15}-X_{18}$ | $X_{19}-X_{22}$ | $X_{23}-X_{26}$ | M |
|---|---|---|---|---|---|
| A-26 | $X_{11}=-O-$, cyclohexyl with $CH_3$ | $X_{15}=-O-$, cyclohexyl with $CH_3$ | $X_{19}=-O-$, cyclohexyl with $CH_3$ | $X_{23}=-O-$, cyclohexyl with $CH_3$ | Cu |
| A-27 | $X_{11}=-O-$, cyclohexyl with $CH_3$, $CH_3$ | $X_{15}=-O-$, cyclohexyl with $CH_3$, $CH_3$ | $X_{19}=-O-$, cyclohexyl with $CH_3$, $CH_3$ | $X_{23}=-O-$, cyclohexyl with $CH_3$, $CH_3$ | Cu |
| A-28 | $X_{11}=-O-$, cyclohexyl with $CH_3$, $CH(CH_3)_2$ | $X_{15}=-O-$, cyclohexyl with $CH_3$, $CH(CH_3)_2$ | $X_{19}=-O-$, cyclohexyl with $CH_3$, $CH(CH_3)_2$ | $X_{23}=-O-$, cyclohexyl with $CH_3$, $CH(CH_3)_2$ | Cu |
| A-29 | $X_{11}=-O-$, cyclohexyl with Ph | $X_{15}=-O-$, cyclohexyl with Ph | $X_{19}=-O-$, cyclohexyl with Ph | $X_{23}=-O-$, cyclohexyl with Ph | Cu |
| A-30 | $X_{11}=-O-$, cyclohexyl with $CF_3$ | $X_{15}=-O-$, cyclohexyl with $CF_3$ | $X_{19}=-O-$, cyclohexyl with $CF_3$ | $X_{23}=-O-$, cyclohexyl with $CF_3$ | Cu |
| A-31 | $X_{11}=-O-$, cyclohexyl with Br | $X_{15}=-O-$, cyclohexyl with Br | $X_{19}=-O-$, cyclohexyl with Br | $X_{23}=-O-$, cyclohexyl with Br | Cu |

-continued

| Dye No. | $X_{11}$–$X_{14}$ | $X_{15}$–$X_{18}$ | $X_{19}$–$X_{22}$ | $X_{23}$–$X_{26}$ | M |
|---|---|---|---|---|---|
| A-32 | $X_{11}$=—O—, cyclohexyl with F, F, C(CH$_3$)$_3$ | $X_{15}$=—O—, cyclohexyl with F, F, C(CH$_3$)$_3$ | $X_{19}$=—O—, cyclohexyl with F, F, C(CH$_3$)$_3$ | $X_{23}$=—O—, cyclohexyl with F, F, C(CH$_3$)$_3$ | Cu |
| A-33 | $X_{11}$=—O—, $X_{12}$=$X_{13}$=$X_{14}$=Br, cyclohexyl with C(CH$_3$)$_3$ | $X_{15}$=—O—, $X_{16}$=$X_{17}$=$X_{18}$=Br, cyclohexyl with C(CH$_3$)$_3$ | $X_{19}$=—O—, $X_{20}$=$X_{21}$=$X_{22}$=Br, cyclohexyl with C(CH$_3$)$_3$ | $X_{23}$=—O—, $X_{24}$=$X_{25}$=$X_{26}$=Br, cyclohexyl with C(CH$_3$)$_3$ | Cu |
| A-34 | $X_{11}$=$X_{14}$=—O—, $X_{12}$=$X_{13}$=F, cyclohexyl with Ph | $X_{15}$=$X_{18}$=—O—, $X_{16}$=$X_{17}$=F, cyclohexyl with Ph | $X_{19}$=$X_{22}$=—O—, $X_{20}$=$X_{21}$=F, cyclohexyl with Ph | $X_{23}$=$X_{26}$=—O—, $X_{24}$=$X_{25}$=F, cyclohexyl with Ph | Cu |
| A-35 | $X_{11}$=—O—, cyclohexyl with C(CH$_3$)$_3$ | H | $X_{19}$=—O—, cyclohexyl with C(CH$_3$)$_3$ | H | Cu |
| A-36 | $X_{11}$=$X_{13}$=—O—, cyclohexyl with C(CH$_3$)$_3$ | H | $X_{19}$=$X_{21}$=—O—, cyclohexyl with C(CH$_3$)$_3$ | $X_{23}$=$X_{26}$=—O—, cyclohexyl with C(CH$_3$)$_3$ | Cu |
| A-37 | $X_{11}$=$X_{13}$=—O—, cyclohexyl with C(CH$_3$)$_3$ | H | $X_{19}$=$X_{21}$=—O—, cyclohexyl with C(CH$_3$)$_3$ | H | Cu |

-continued

| Dye No. | $X_{11}-X_{14}$ | $X_{15}-X_{18}$ | $X_{19}-X_{22}$ | $X_{23}-X_{26}$ | M |
|---|---|---|---|---|---|
| A-38 | $X_{11}=-S$, $C(CH_3)_3$ | $X_{15}=-S$, $C(CH_3)_3$ | $X_{19}=-S$, $C(CH_3)_3$ | $X_{23}=-S$, $C(CH_3)_3$ | Cu |
| A-39 | $X_{11}=-O$, $CH_3$, $C(CH_3)_3$ | $X_{15}=-O$, $CH_3$, $C(CH_3)_3$ | $X_{19}=-O$, $CH_3$, $C(CH_3)_3$ | $X_{23}=-O$, $CH_3$, $C(CH_3)_3$ | Pd |
| A-40 | $X_{11}=-O$, $CH_3$, $C(CH_3)_3$ | $X_{15}=-O$, $CH_3$, $C(CH_3)_3$ | $X_{19}=-O$, $CH_3$, $C(CH_3)_3$ | $X_{23}=-O$, $CH_3$, $C(CH_3)_3$ | Ni |
| A-41 | $X_{11}=-O$, $CH_3$, $C(CH_3)_3$ | $X_{15}=-O$, $CH_3$, $C(CH_3)_3$ | $X_{19}=-O$, $CH_3$, $C(CH_3)_3$ | $X_{23}=-O$, $CH_3$, $C(CH_3)_3$ | Fe |
| A-42 | $X_{11}=-O$, $CH_3$, $C(CH_3)_3$ | $X_{15}=-O$, $CH_3$, $C(CH_3)_3$ | $X_{19}=-O$, $CH_3$, $C(CH_3)_3$ | $X_{23}=-O$, $CH_3$, $C(CH_3)_3$ | Co |
| A-43 | $X_{11}=-O$, $CH_3$, $C(CH_3)_3$ | $X_{15}=-O$, $CH_3$, $C(CH_3)_3$ | $X_{19}=-O$, $CH_3$, $C(CH_3)_3$ | $X_{23}=-O$, $CH_3$, $C(CH_3)_3$ | VO |

-continued

| Dye No. | $X_{11}$–$X_{14}$ | $X_{15}$–$X_{18}$ | $X_{19}$–$X_{22}$ | $X_{23}$–$X_{26}$ | M |
|---|---|---|---|---|---|
| A-44 | $X_{11}=$—O-(2-C(CH$_3$)$_3$-cyclohexyl) | $X_{15}=$—O-(2-CH$_3$,6-C(CH$_3$)$_3$-cyclohexyl) | $X_{19}=$—O-(2-C(CH$_3$)$_3$-cyclohexyl) | $X_{23}=$—O-(2-CH$_3$,6-C(CH$_3$)$_3$-cyclohexyl) | Cu |
| A-45 | $X_{11}=$—O-(2-CH$_3$-pyridin-3-yl) | $X_{15}=$—O-(2-CH$_3$-pyridin-3-yl) | $X_{19}=$—O-(2-CH$_3$-pyridin-3-yl) | $X_{23}=$—O-(2-CH$_3$-pyridin-3-yl) | Cu |
| A-46 | $X_{11}=$—O-(3-Ph-2-oxo-2,5-dihydrofuran-4-yl) | $X_{15}=$—O-(3-Ph-2-oxo-2,5-dihydrofuran-4-yl) | $X_{19}=$—O-(3-Ph-2-oxo-2,5-dihydrofuran-4-yl) | $X_{23}=$—O-(3-Ph-2-oxo-2,5-dihydrofuran-4-yl) | Cu |
| A-47 | $X_{11}=$—OCHCH(CH$_3$)$_2$<br>—CH$_2$CH(CH$_3$)$_2$ | $X_{15}=$—OCHCH(CH$_3$)$_2$<br>—CH$_2$CH(CH$_3$)$_2$ | $X_{19}=$—OCHCH(CH$_3$)$_2$<br>—CH$_2$CH(CH$_3$)$_2$ | $X_{23}=$—OCHCH(CH$_3$)$_2$<br>—CH$_2$CH(CH$_3$)$_2$ | Cu |
| A-48 | $X_{11}=$—OCH$_2$CHC$_4$H$_9$<br>—C$_2$H$_5$ | $X_{15}=$—OCH$_2$CHC$_4$H$_9$<br>—C$_2$H$_5$ | $X_{19}=$—OCH$_2$CHC$_4$H$_9$<br>—C$_2$H$_5$ | $X_{23}=$—OCH$_2$CHC$_4$H$_9$<br>—C$_2$H$_5$ | Cu |
| A-49 | $X_{11}=$—OCHCH(CH$_3$)$_2$<br>—CH$_3$ | $X_{15}=$—OCHCH(CH$_3$)$_2$<br>—CH$_3$ | $X_{19}=$—OCH$_2$CHC$_4$H$_9$<br>—CH$_3$ | $X_{23}=$—OCH$_2$CHC$_4$H$_9$<br>—CH$_3$ | Ni |
| A-50 | $X_{11}=$—OCHCH(CH$_3$)$_2$<br>—CH$_2$CH(CH$_3$)$_2$ | $X_{15}=$—OCHCH(CH$_3$)$_2$<br>—CH$_2$CH(CH$_3$)$_2$ | $X_{19}=$—OCH$_2$CHC$_4$H$_9$<br>—C$_2$H$_5$ | $X_{23}=$—OCH$_2$CHC$_4$H$_9$<br>—C$_2$H$_5$ | Cu |
| A-51 | $X_{11}=$—O-(2-C(CH$_3$)$_3$-phenyl) | $X_{15}=$—O-(2-C(CH$_3$)$_3$-phenyl) | $X_{19}=$—O-(2-C(CH$_3$)$_3$-phenyl) | $X_{23}=$—O-(2-C(CH$_3$)$_3$-phenyl) | Co |

These phthalocyanine dyes may be synthesized in the light of methods as disclosed in JP-A 313760/1988, JP-A 301261/1988, etc.

Synthesis examples are given below.

SYNTHESIS EXAMPLE 1

Synthesis of Dye No. A-1

In 5 ml of dimethylformamide (DMF), 1.73 g of 1,2-dicyano-3-nitrobenzene and 4.12 g of 2,4-di-tert-butylhydroxybenzene were reacted at 80° C. for 2 hours while 5.0 g of $K_2CO_3$ was added. After the completion of reaction, the reaction product was extracted twice with a mixed solvent of water and ethyl acetate (in a volume ratio of 1/1). The ethyl acetate extracted layer was dried overnight over $MgSO_4$ and the ethyl acetate was distilled off. The residue was isolated and purified by silica gel column chromatography using chloroform, obtaining 2.65 g of 1,2-dicyano-3-(2,4-tert-butylphenyloxy)benzene (yield 80%).

Then, 1.66 g of this compound and 0.20 g of CuCl in 10 ml of amyl alcohol were heated under reflux for reaction at 200° C. for 5 hours in the presence of 1.52 g of 1,8-diazabicyclo[5.4.0]-7-undecene (DBU). The resulting reaction product was isolated by silica gel column chromatography using chloroform, obtaining 1.22 g of the end product (yield 70%, mp 285°–290° C.).

SYNTHESIS EXAMPLE 2

Synthesis of Dye No. A-3

As in Synthesis Example 1, this was synthesized by the following procedure.

In 5 ml of dimethylformamide (DMF), 1.73 g of 1,2-dicyano-3-nitrobenzene and 4.68 g of 2-tert-butylcyclohexanol were reacted at 80° C. for 2 hours while 5.0 g of $K_2CO_3$ was added. After the completion of reaction, the reaction product was extracted twice with a mixed solvent of water and ethyl acetate (in a volume ratio of 1/1). The ethyl acetate extracted layer was dried overnight over $MgSO_4$ and the ethyl acetate was distilled off. The residue was isolated and purified by silica gel column chromatography using chloroform, obtaining 1.41 g of 1,2-dicyano-2-tertbutylcyclohexyloxy)benzene (yield 50%).

Then, 1.41 g of this compound and 0.14 g of CuCl in 10 ml of amyl alcohol were heated under reflux for reaction at 200° C. for 5 hours in the presence of 0.76 g of 1,8-diazabicyclo[5.4.0]-7-undecene (DBU). The resulting reaction product was isolated by silica gel column chromatography using chloroform, obtaining 0.97 g of the end product (yield 65%, mp 220°–222° C.).

Other exemplified dyes were synthesized as mentioned above or in accordance with the same or approximately the same procedure as above (yield about 45 to about 80%).

These dyes may be identified by elementary analysis, visible light absorption spectra, infrared absorption spectra, mass spectra, nuclear magnetic resonance absorption spectra, etc.

These dyes have a melting point (mp) of 60° to 400° C.

These phthalocyanine dyes have n and k at 780 nm as reported in Tables 1 and 2. These values of n and k were determined from a dye film of 80 nm thick. The half-value width of an absorption spectrum of a dye thin film was also determined as mentioned above, with the results being reported together with λmax (thin film).

TABLE 1

| Dye No. | (780 nm) n | (780 nm) k | (absorption spectrum) λmax, nm | Half-value width, nm |
|---|---|---|---|---|
| A-1 | 2.2 | 0.08 | 724 | 130 |
| A-2 | 2.3 | 0.05 | 715 | 140 |
| A-3 | 2.4 | 0.10 | 725 | 125 |
| A-4 | 2.3 | 0.10 | 724 | 130 |
| A-5 | 2.3 | 0.11 | 724 | 125 |
| A-6 | 2.4 | 0.10 | 725 | 130 |
| A-7 | 2.3 | 0.09 | 723 | 120 |
| A-8 | 2.2 | 0.10 | 725 | 140 |
| A-9 | 2.2 | 0.10 | 723 | 120 |
| A-10 | 2.3 | 0.11 | 723 | 130 |
| A-11 | 2.2 | 0.11 | 723 | 125 |
| A-12 | 2.1 | 0.10 | 726 | 125 |
| A-13 | 2.2 | 0.10 | 727 | 125 |
| A-14 | 2.2 | 0.10 | 725 | 125 |
| A-15 | 2.2 | 0.11 | 723 | 130 |
| A-16 | 2.3 | 0.12 | 725 | 130 |
| A-17 | 2.3 | 0.10 | 723 | 125 |
| A-18 | 2.3 | 0.09 | 725 | 125 |
| A-19 | 2.2 | 0.05 | 715 | 130 |
| A-20 | 2.2 | 0.08 | 720 | 130 |
| A-21 | 2.2 | 0.07 | 718 | 135 |
| A-22 | 2.2 | 0.08 | 720 | 140 |
| A-23 | 2.2 | 0.13 | 730 | 120 |
| A-24 | 2.2 | 0.11 | 725 | 125 |
| A-25 | 2.2 | 0.10 | 726 | 125 |

TABLE 2

| Dye No. | (780 nm) n | (780 nm) k | (absorption spectrum) λmax, nm | Half-value width, nm |
|---|---|---|---|---|
| A-26 | 2.3 | 0.09 | 725 | 130 |
| A-27 | 2.3 | 0.09 | 720 | 135 |
| A-28 | 2.4 | 0.09 | 725 | 130 |
| A-29 | 2.3 | 0.10 | 720 | 125 |
| A-30 | 2.4 | 0.11 | 723 | 125 |
| A-31 | 2.3 | 0.10 | 721 | 125 |
| A-32 | 2.2 | 0.11 | 722 | 130 |
| A-33 | 2.3 | 0.10 | 724 | 125 |
| A-34 | 2.4 | 0.10 | 725 | 130 |
| A-35 | 2.4 | 0.10 | 721 | 125 |
| A-36 | 2.4 | 0.10 | 722 | 135 |
| A-37 | 2.3 | 0.09 | 725 | 140 |
| A-38 | 2.3 | 0.09 | 725 | 135 |
| A-39 | 2.3 | 0.07 | 715 | 135 |
| A-40 | 2.3 | 0.08 | 720 | 135 |
| A-41 | 2.3 | 0.08 | 720 | 125 |
| A-42 | 2.3 | 0.08 | 720 | 135 |
| A-43 | 2.2 | 0.09 | 728 | 140 |
| A-44 | 2.2 | 0.09 | 728 | 140 |
| A-45 | 2.2 | 0.09 | 726 | 135 |
| A-46 | 2.2 | 0.10 | 727 | 140 |
| A-47 | 2.2 | 0.09 | 723 | 130 |
| A-48 | 2.2 | 0.10 | 725 | 135 |
| A-49 | 2.3 | 0.08 | 718 | 140 |
| A-50 | 2.2 | 0.10 | 726 | 125 |
| A-51 | 2.2 | 0.07 | 718 | 130 |

It is noted that dyes A may be used alone or in admixture of two or more as previously mentioned. Where two or more dyes are combined, they may be selected such that a mixture may have n, k, and a half-value width of thin film absorption spectrum within the previously mentioned ranges.

Next, dye B is not critical insofar as it satisfies n and k in the above-mentioned ranges. Included are trimethinecyanine dyes, sub-phthalocyanine boron complexes, metal complex dyes, styryl dyes, porphyrin dyes, azo dyes, azo metal complex dyes, and formazan metal complexes. These dyes may be used alone or in admixture of two or more as previously mentioned. Where two or more dyes are combined, they may be selected such that a mixture may have n and k within the previously mentioned ranges.

Among these dyes, trimethinecyanine dyes etc. are used for availability. The trimethinecyanine dyes are typically of the formula (II).

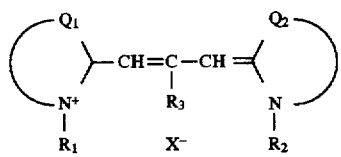

Formula (II) is described. In formula (II), each of $Q_1$ and $Q_2$ is a group of atoms necessary to complete a heterocyclic ring with the carbon and nitrogen atoms, the heterocyclic skeletons completed by $Q_1$ and $Q_2$ may be the same or different, with the same skeletons being preferred from the standpoint of synthesis. For these heterocyclic skeletons, mention is preferably made of benzothiazole, thiazole, oxazole, benzoxazole, pyridine, quinoline, imidazole, indolenine, benzoindolenine, and dibenzoindolenine skeletons.

The heterocyclic skeleton completed by $Q_1$ or $Q_2$ may have a substituent, which includes halogen atoms, alkyl, aryl, acyl, and amino radicals.

Each of $R_1$ and $R_2$ is an aliphatic hydrocarbon radical, and they may be the same or different. Examples of the aliphatic hydrocarbon radical include alkyl and cycloalkyl radicals. Preferred alkyl radicals are those having 1 to 4 carbon atoms, for example, methyl, ethyl, propyl and butyl radicals. Examples of the cycloalkyl radical are cyclohexyl and other radicals. They may have a substituent. Examples of the substituent include halogen atoms, alkyl radicals, aryl radicals, ether radicals including alkoxy radicals, ester radicals, and heterocyclic radicals. Among others, unsubstituted alkyl radicals are preferred, with methyl, ethyl and butyl radicals being especially preferred. From the standpoint of improving the solubility in a specific coating solvent such as ethyl cellosolve, alkoxyalkyl radicals having an ether bond, especially alkoxyalkyl radicals having 3 to 6 carbon atoms in total are preferred.

$R_3$ is a hydrogen atom or monovalent substituent. Examples of the monovalent substituent include alkyl, aryl, azo, ester, acyl radicals, halogen atoms and heterocyclic radicals. Among these monovalent radicals, the alkyl, aryl, azo, ester, acyl, and heterocyclic radicals may have a substituent. Where they have a substituent, exemplary substituents are halogen atoms, alkyl, alkoxy, amino, heterocyclic and nitro radicals.

$X^-$ is a monovalent anion, for example, $ClO_4^-$, $I^-$, $BF_4^-$, $PF_6^-$, $SbF_6^-$, and para-toluenesulfonate ion.

Preferred among the trimethinecyanine dyes of formula (II) are trimethineindolenine cyanine dyes of formula (III).

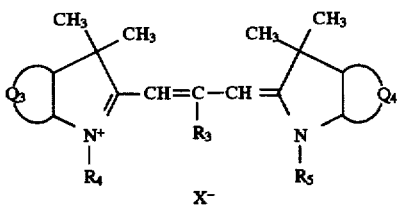

Formula (III) is described. In formula (III), each of $Q_3$ and $Q_4$ is a group of atoms necessary to complete an indolenine or benzoindolenine ring with the pyrrole ring, the rings completed by $Q_3$ and $Q_4$ may be the same or different. The indolenine or benzoindolenine ring may have a substituent, which includes halogen atoms, alkyl, aryl, acyl, and amino radicals.

Where the ring completed by $Q_3$ or $Q_4$ is a benzoindolenine ring, the position of fusion of the benzene ring to the indolenine ring is not critical although the benzene ring is preferably fused to the indolenine ring at its 4 and 5-positions (see formula (IIIa) shown later).

Specifically, a combination of $Q_3$ and $Q_4$ wherein one is an indolenine ring and the other is a benzoindolenine ring is preferred when the dyes are commensurate with 630 to 640 nm. A combination of $Q_3$ and $Q_4$ wherein both are benzoindolenine rings is preferred when the dyes are commensurate with from more than 640 to 680 nm.

$R_3$ is a hydrogen atom or monovalent substituent, which is as defined for $R_3$ in formula (II). $R_3$ is preferably a hydrogen atom.

Each of $R_4$ and $R_5$ is an alkyl radical. The alkyl radical may have a substituent and preferably has 1 to 4 carbon atoms. The substituents are as previously exemplified for the substituent on $R_1$ and $R_2$, with alkoxy radicals being especially preferred. Examples of the alkyl radical represented by $R_4$ and $R_5$ include methyl, ethyl, n- and i-propyl, n-, i-, s- and t-butyl, methoxymethyl, methoxyethyl, and ethoxyethyl radicals.

Unsubstituted alkyl and alkoxyalkyl radicals are preferred for $R_4$ and $R_5$. From the standpoint of improving the solubility in a specific coating solvent such as ethyl cellosolve, it is preferred that at least one of $R_4$ and $R_5$ is an alkoxyalkyl radical, especially an alkoxyalkyl radical having 3 to 6 carbon atoms in total.

$X^-$ is an anion as defined for $X^-$ in formula (II).

Preferred among the trimethineindolenine cyanine dyes of formula (III) are those dyes of formulae (IIIa) and (IIIb) shown below.

The dyes of formula (IIIa) are commensurate with 630 to 640 nm and the dyes of formula (IIIb) are commensurate with from more than 640 to 680 nm.

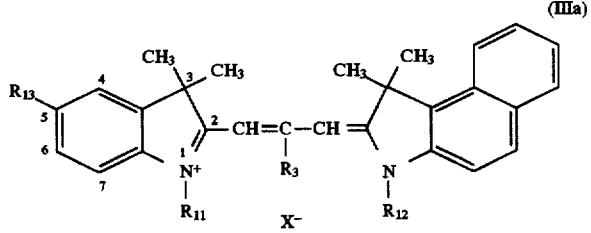

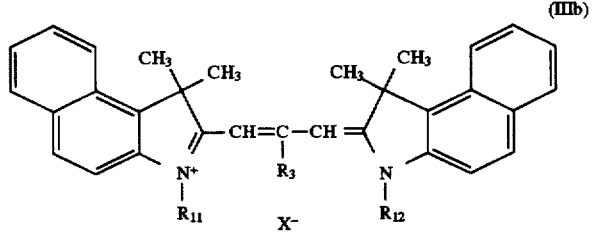

In formulae (IIIa) and (IIIb), $R_{11}$ and $R_{12}$ are as defined for $R_4$ and $R_5$ in formula (III), respectively; $R_3$ is as defined for $R_3$ in formula (III), preferably a hydrogen atom; and $X^-$ is as defined for $X^-$ in formula (III). In formula (IIIa), $R_{13}$ is a hydrogen atom, halogen atom or alkyl radical, preferably alkyl radical having 1 to 4 carbon atoms.

It is noted that in formulae (IIIa) and (IIIb), the indolenine and benzoindolenine rings may further have a substituent such as a halogen atom, alkyl, aryl, acyl and amino radical in addition to the above-mentioned $R_{13}$.

Also in formulae (IIIa) and (IIIb), $R_{11}$ and $R_{12}$ are preferably unsubstituted alkyl and alkoxyalkyl radicals. From the standpoint of increasing the solubility in a specific coating solvent such as ethyl cellosolve to form coatings of better quality, it is preferred that either one or both of $R_{11}$ and $R_{12}$ are alkoxyalkyl radicals. Examples of the alkoxyalkyl radical are methoxymethyl, methoxyethyl and ethoxyethyl radicals as exemplified in conjunction with formula (III). The alkoxyalkyl radical should preferably have 3 to 6 carbon atoms in total.

Illustrative examples of the trimethinecyanine dyes used herein are given below although the invention is not limited thereto.

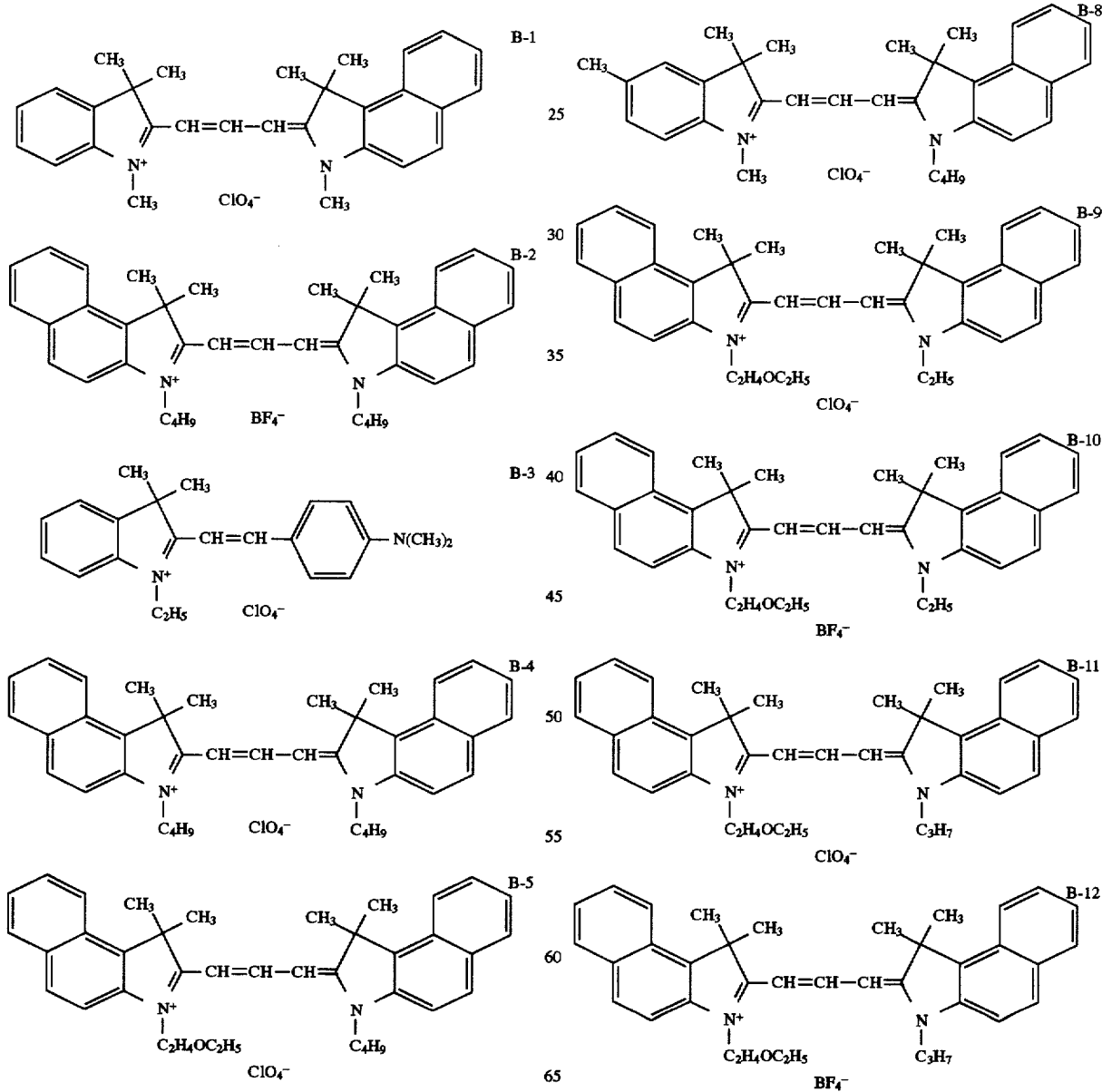

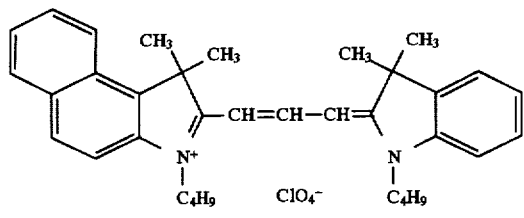 B-13
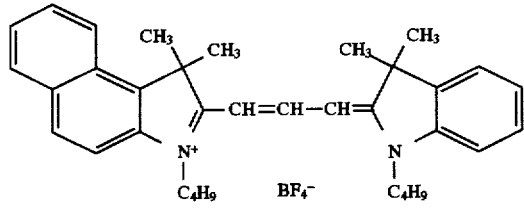 B-14
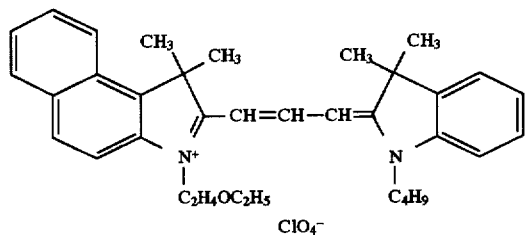 B-15
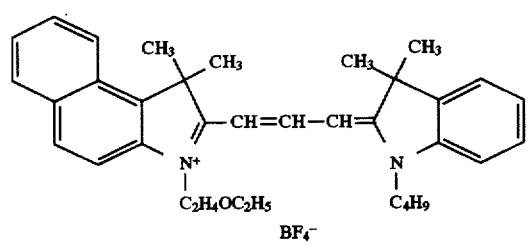 B-16
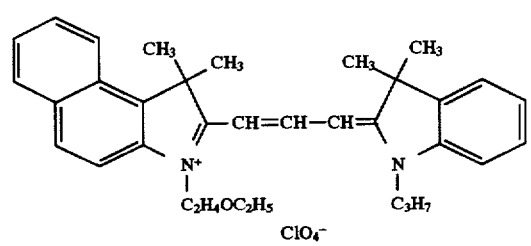 B-17
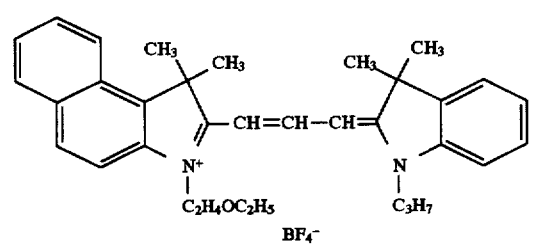 B-18
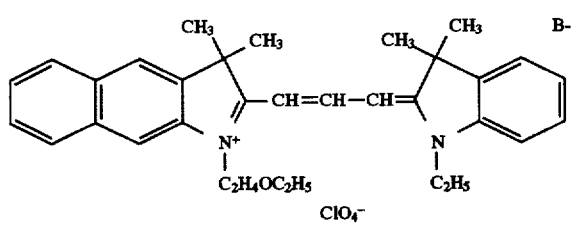 B-19
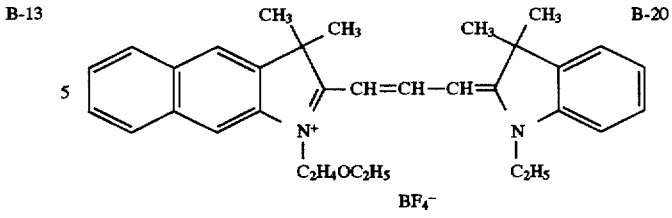 B-20
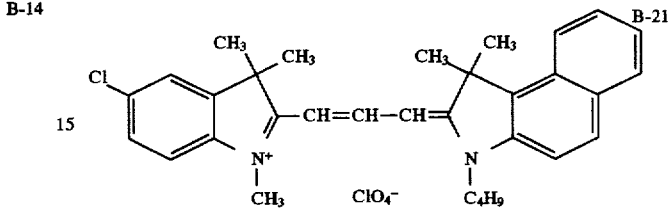 B-21
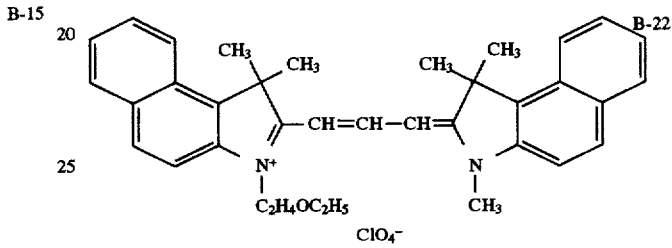 B-22
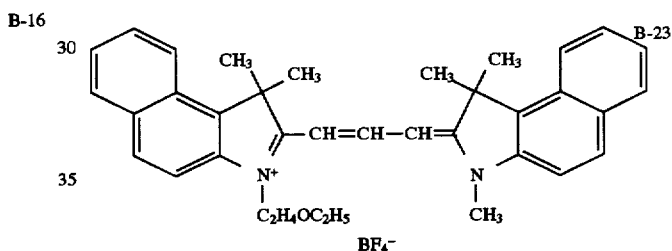 B-23
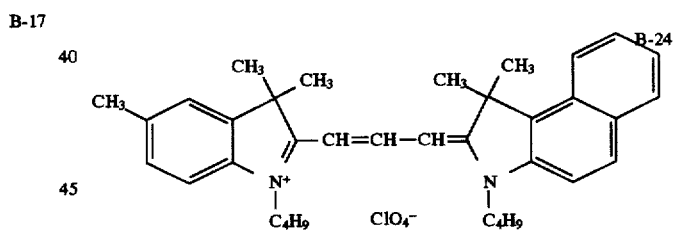 B-24
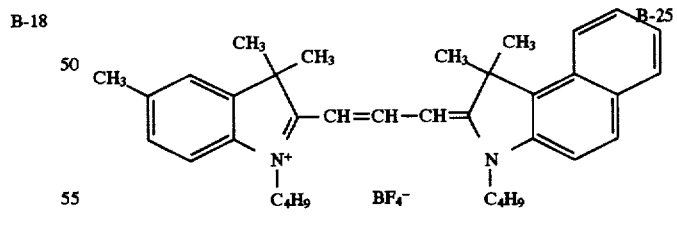 B-25
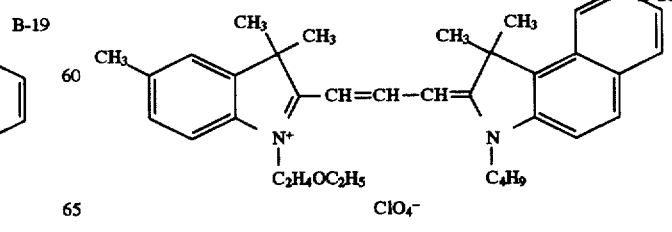 B-26

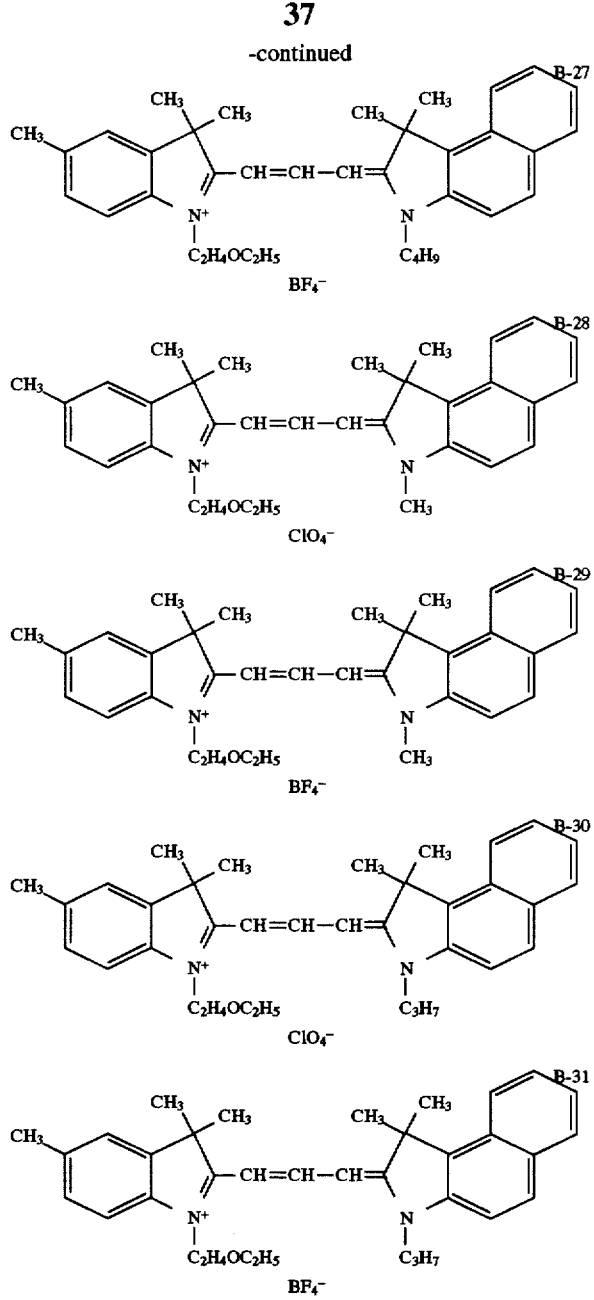

These trimethinecyanine dyes may be used alone or in admixture of two or more. The trimethinecyanine dyes have λmax in the range of 550 to 650 nm as measured on a dye thin film of 80 nm thick and a melting point (mp) in the range of 100° to 300° C.

For these trimethinecyanine dyes, λmax and n and k as measured at 630 nm or 650 nm on a dye film of 80 nm thick are shown in Tables 3 and 4.

TABLE 3

| Dye No. | n | k | (measuring wavelength, nm) | λmax (nm) |
|---|---|---|---|---|
| B-1 | 2.3 | 0.03 | (630) | 570 |
| B-2 | 2.5 | 0.08 | (650) | 610 |
| B-3 | 2.3 | 0.05 | (630) | 575 |
| B-4 | 2.5 | 0.09 | (650) | 612 |
| B-5 | 2.45 | 0.09 | (650) | 611 |
| B-6 | 2.45 | 0.08 | (650) | 614 |

TABLE 3-continued

| Dye No. | n | k | (measuring wavelength, nm) | λmax (nm) |
|---|---|---|---|---|
| B-7 | 2.40 | 0.09 | (650) | 612 |
| B-8 | 2.45 | 0.09 | (630) | 582 |
| B-9 | 2.40 | 0.12 | (650) | 613 |
| B-10 | 2.35 | 0.10 | (650) | 612 |
| B-11 | 2.40 | 0.11 | (650) | 611 |
| B-12 | 2.40 | 0.10 | (650) | 612 |
| B-13 | 2.30 | 0.02 | (630) | 571 |
| B-14 | 2.35 | 0.03 | (630) | 572 |
| B-15 | 2.30 | 0.02 | (630) | 570 |

TABLE 4

| Dye No. | n | k | (measuring wavelength, nm) | λmax (nm) |
|---|---|---|---|---|
| B-16 | 2.30 | 0.02 | (630) | 571 |
| B-17 | 2.35 | 0.03 | (630) | 573 |
| B-18 | 2.30 | 0.04 | (630) | 573 |
| B-19 | 2.20 | 0.02 | (630) | 568 |
| B-20 | 2.20 | 0.02 | (630) | 569 |
| B-21 | 2.35 | 0.07 | (630) | 580 |
| B-22 | 2.50 | 0.04 | (650) | 598 |
| B-23 | 2.50 | 0.04 | (650) | 598 |
| B-24 | 2.45 | 0.04 | (630) | 598 |
| B-25 | 2.45 | 0.04 | (630) | 598 |
| B-26 | 2.45 | 0.04 | (630) | 598 |
| B-27 | 2.45 | 0.04 | (630) | 598 |
| B-28 | 2.45 | 0.04 | (630) | 598 |
| B-29 | 2.45 | 0.04 | (630) | 599 |
| B-30 | 2.45 | 0.04 | (630) | 599 |
| B-31 | 2.45 | 0.04 | (630) | 598 |

In the practice of the invention, a metal complex quencher which is a singlet oxygen quencher is preferably used as a stabilizer along with the trimethinecyanine dye in order to improve the light resistance of the trimethinecyanine dye. Such a metal complex quencher may be selected from the compounds described in JP-A 59795/1984, 118748/1985, and 118749/1985.

Examples of the metal complex quencher include those of acetylacetonato systems, bisdithiol systems such as bisdithio-α-diketone and bisphenyldithiol systems, thiocatechol systems, salicylaldehydeoxime systems, and thiobisphenolate systems. Preferred among others are metal complex quenchers of the bisphenyldithiol system. The center metal is, for example, Ni, Cu, Co, Pd, and Pt, with Ni and Cu, especially Cu being preferred.

The amount of the metal complex quencher used may be suitably determined in accordance with a particular dye used.

Also the metal complex quencher may be used in a bonded form wherein the metal complex quencher anion forms the counter anion to the trimethinecyanine dye cation, that is, X⁻ in formula (II). Preferred in this case are anions of the same metal complex quenchers as above, especially anions of bisphenyldithiol system metal complex quenchers. Preferred center metals are as described above. The bonded form may be obtained by salt exchange.

Further in the practice of the invention, it is especially preferred to use a metal-containing azo compound of formula (IV) as the metal complex quencher. Since the metal-containing azo compound exhibits substantially the same absorption as the trimethinecyanine dye, it is effective for improving the light resistance of the dye without changing the reflectance of the dye itself.

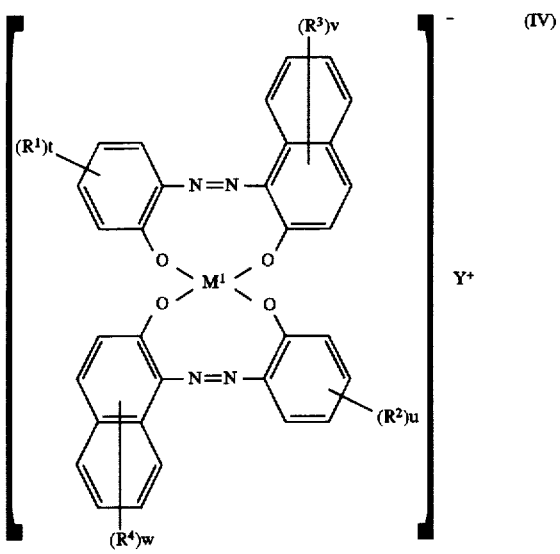

Formula (IV) is described. In formula (IV), each of $R^1$ and $R^2$ is a nitro radical, halogen atom, amino radical, sulfamoyl radical, alkyl radical or alkoxy radical.

The halogen atom represented by $R^1$ and $R^2$ includes F, Cl, Br, and I.

The amino radical represented by $R^1$ and $R^2$ may have a substituent such as an alkyl, alkoxy and acyl radical, which substituent may, in turn, have a substituent such as a halogen atom (Cl, Br, I, etc.), hydroxyl radical and alkoxy radical. Examples of the amino radical represented by $R^1$ and $R^2$ are amino, methylamino, dimethylamino, acetylamino, and benzylamino radicals. The total number of carbon atoms in such an amino radical should preferably be 0 to 8.

The sulfamoyl radical represented by $R^1$ and $R^2$ may have a substituent such as an alkyl and alkoxy radical, which substituent may, in turn, have a substituent such as a halogen atom (Cl, Br, I, etc.), hydroxyl radical and alkoxy radical. Examples of the sulfamoyl radical represented by $R^1$ and $R^2$ are sulfamoyl, N-methylsulfamoyl, N,N-dimethylsulfamoyl, N,N-diethylsulfamoyl, N,N-methylhydroxyethylsulfamoyl, N,N-methoxyethylsulfamoyl, and N-methoxyethylsulfamoyl radicals. The total number of carbon atoms in such a sulfamoyl radical should preferably be 0 to 10.

The alkyl radical represented by $R^1$ and $R^2$ preferably has 1 to 4 carbon atoms, may be either normal or branched, and may have a substituent (e.g., halogen atom and alkoxy radical). Examples of the alkyl radical include methyl, ethyl, n-propyl, isopropyl, n-butyl, isobutyl, s-butyl, t-butyl, and methoxyethyl radicals.

The alkoxy radical represented by $R^1$ and $R^2$ is preferably one in which the alkyl moiety has 1 to 4 carbon atoms, and may have a substituent (e.g., halogen atoms). Exemplary are methoxy and ethoxy radicals.

In formula (IV), each of $R^3$ and $R^4$ is a halogen atom, nitro radical, alkyl radical, alkoxy radical or amino radical.

The halogen atom, alkyl radical, alkoxy radical and amino radical represented by $R^3$ and $R^4$ are as defined for $R^1$ and $R^2$.

Each of t and u is 0 or an integer of 1 to 4, each of v and w is 0 or an integer of 1 to 6, they are not equal to 0 at the same time, and the sum of t+u+v+w is 1 to 20. Where t, u, v or w is an integer of 2 or more, the $R^1$ radicals, $R^2$ radicals, $R^3$ radicals or $R^4$ radicals may be the same or different. Under these conditions, each of t and u is preferably 0, 1 or 2, and each of v and w is preferably 0 or 1. It is also preferred that t=u and v=w. It is preferred that whether or not two benzene rings or two naphthalene rings have a substituent, and if present, the type, position and number of substituents are the same between the two rings.

It is noted that the present invention should preferably avoid a combination of substituents in formula (IV) wherein t and u are integers of at least 1, electron attractive radicals such as nitro radicals are present as $R^1$ and $R^2$, v and w are integers of at least 1, and electron donative radicals such as amino radicals are present as $R^3$ and $R^4$. The present invention should also preferably avoid an inverse combination of substituents in formula (IV) wherein electron donative radicals such as amino radicals are present as $R^1$ and $R^2$ and electron attractive radicals such as nitro radicals are present as $R^3$ and $R^4$.

In formula (IV), $M^1$ is Co or Ni, with Co being especially preferred.

In formula (IV), $Y^+$ is an alkyl-substituted ammonium ion. The alkyl moiety of the alkyl-substituted ammonium ion may be either normal or branched and may have a substituent (e.g., ether, acyloxy and aryl radicals). Especially an ammonium ion having an alkyl radical with an intervening ether bond (—O—) is preferred. The total number of carbon atoms in the alkyl-substituted ammonium ion is preferably 4 to 21.

Illustrative examples of the alkyl-substituted ammonium ion represented by $Y^+$ are given below.

$Y^+$-1 $CH_3O(CH_2)_3NH_3^+$
$Y^+$-2 $C_6H_5—CH_2O—(CH_2)_2NH(CH_3)_2^+$
$Y^+$-3 $CH_3—O—CH_2CH_2—O—(CH_2)_2NH(i-C_3H_7)_2^+$
$Y^+$-4 $i-C_3H_7O—(CH_2)_3NH_3^+$
$Y^+$-5 $C_4H_9O—(CH_2)_3NH_2(—CH_2C_6H_5)^+$
$Y^+$-6 $t-C_4H_9O—(CH_2)_3NH_2(i-C_3H_7)^+$
$Y^+$-7 $(CH_3O)_2CHCH_2NH_2(CH_3)^+$
$Y^+$-8 $C_6H_{13}O—(CH_2)_2NH_3^+$
$Y^+$-9 $CH_3(CH_2)_3CH(C_2H_5)CH_2O(CH_2)_3NH_3^+$
$Y^+$-10 $C_5H_{11}O—(CH_2)_2CH(NH_3)CH_3^+$
$Y^+$-11 $i-C_3H_7O—(CH_2)_2NH_3^+$
$Y^+$-12 $C_2H_5O—(CH_2)_3NH(OCH_3)(C_2H_5)^+$
$Y^+$-13 $C_2H_5O—C_2H_4O—(CH_2)_3NH_3^+$
$Y^+$-14 $i-C_5H_{11}O—(CH_2)_2NH_3^+$
$Y^+$-15 $i-C_{13}H_{27}NH_3^+$
$Y^+$-16 $CH_3(CH_2)_2CH(C_2H_5)(CH_2)_2O(CH_2)_3NH_3^+$
$Y^+$-17 $(C_2H_5)_2CH—(CH_2)_3O(CH_2)_3NH_3^+$
$Y^+$-18 $CH_3CH(C_2H_5)(CH_2)_4O(CH_2)_3NH_3^+$
$Y^+$-19 $CH_3(CH_2)_3CH(C_2H_5)(CH_2)_2O(CH_2)_2NH_3^+$

Illustrative examples of the metal-containing azo compound of formula (IV) which can be used herein are given below although the invention is not limited thereto. Examples are shown below by combinations of substituents in formula (IVa) wherein $Y^+$ is expressed by $Y^+$-1 etc. exemplified just above. Where all of $R^{11}$ to $R^{14}$ etc. are hydrogen, it is shown by "H." Where any of $R^{11}$ to $R^{14}$ has a substituent, only the substituted one is shown, with the expression "H" being omitted.

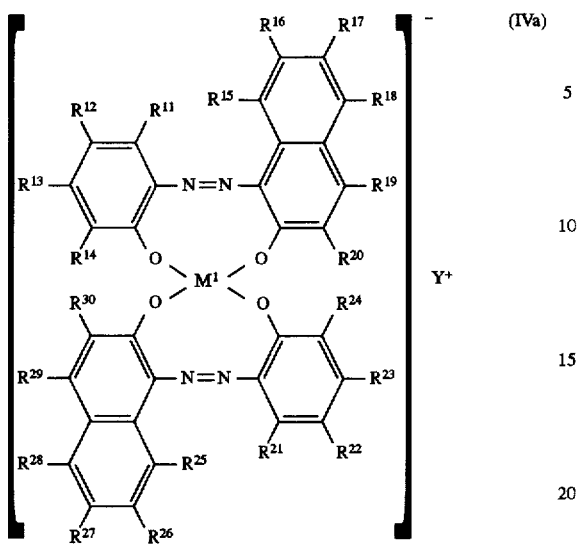

(IVa)

| Compound No. | R¹¹–R¹⁴ | R¹⁶–R²⁰ | R²¹–R²⁴ | R²⁶–R³⁰ | M¹ | Y⁺ |
|---|---|---|---|---|---|---|
| I-1 | $R^{12} = -SO_2NH_2$ | H | $R^{22} = -SO_2NH_2$ | H | Co | Y⁺-9 |
| I-2 | $R^{12} = -SO_2NH_2$ | $R^{19} = CH_3$ | $R^{22} = -SO_2NH_2$ | $R^{29} = CH_3$ | Co | Y⁺-9 |
| I-3 | $R^{12} = NO_2$ | H | $R^{22} = NO_2$ | H | Co | Y⁺-9 |
| I-4 | $R^{12} = Cl$ $R^{13} = CH_3$ | H | $R^{22} = Cl$ $R^{23} = CH_3$ | H | Co | Y⁺-9 |
| I-5 | $R^{12} = Cl$ $R^{13} = OCH_3$ | H | $R^{22} = Cl$ $R^{23} = OCH_3$ | H | Co | Y⁺-9 |
| I-6 | $R^{12} = -SO_2NH_2$ | H | $R^{22} = -SO_2NH_2$ | H | Co | Y⁺-1 |
| I-7 | $R^{12} = -SO_2NH_2$ | H | $R^{22} = -SO_2NH_2$ | H | Co | Y⁺-2 |
| I-8 | $R^{12} = -SO_2NH_2$ | H | $R^{22} = -SO_2NH_2$ | H | Co | Y⁺-3 |
| I-9 | $R^{12} = -SO_2NH_2$ | H | $R^{22} = -SO_2NH_2$ | H | Co | Y⁺-4 |
| I-10 | $R^{12} = -SO_2NH_2$ | H | $R^{22} = -SO_2NH_2$ | H | Co | Y⁺-5 |
| I-11 | $R^{12} = -SO_2NH_2$ | H | $R^{22} = -SO_2NH_2$ | H | Co | Y⁺-6 |
| I-12 | $R^{12} = -SO_2NH_2$ | H | $R^{22} = -SO_2NH_2$ | H | Co | Y⁺-7 |
| I-13 | $R^{12} = -SO_2NH_2$ | H | $R^{22} = -SO_2NH_2$ | H | Co | Y⁺-8 |
| I-14 | $R^{12} = -SO_2NH_2$ | H | $R^{22} = -SO_2NH_2$ | H | Co | Y⁺-10 |
| I-15 | $R^{12} = -SO_2NH_2$ | H | $R^{22} = -SO_2NH_2$ | H | Co | Y⁺-11 |
| I-16 | $R^{12} = -SO_2NH_2$ | H | $R^{22} = -SO_2NH_2$ | H | Co | Y⁺-12 |
| I-17 | $R^{12} = -SO_2NH_2$ | H | $R^{22} = -SO_2NH_2$ | H | Co | Y⁺-13 |
| I-18 | $R^{12} = -SO_2NH_2$ | H | $R^{22} = -SO_2NH_2$ | H | Co | Y⁺-14 |
| I-19 | $R^{12} = -SO_2NH_2$ | H | $R^{22} = -SO_2NH_2$ | H | Co | Y⁺-15 |
| I-20 | $R^{12} = -SO_2NH_2$ | H | $R^{22} = -SO_2NH_2$ | H | Co | Y⁺-16 |
| I-21 | $R^{12} = -SO_2NH_2$ | H | $R^{22} = -SO_2NH_2$ | H | Co | Y⁺-17 |
| I-22 | $R^{12} = -SO_2NH_2$ | H | $R^{22} = -SO_2NH_2$ | H | Co | Y⁺-18 |
| I-23 | $R^{12} = -SO_2NH_2$ | H | $R^{22} = -SO_2NH_2$ | H | Co | Y⁺-19 |
| I-24 | $R^{12} = -SO_2NH_2$ | H | $R^{22} = -SO_2NH_2$ | H | Ni | Y⁺-9 |
| I-25 | $R^{12} = -SO_2NH_2$ | H | $R^{22} = -SO_2NH_2$ | H | Ni | Y⁺-15 |
| I-26 | $R^{12} = -SO_2NH_2$ $-C_2H_4-OCH_3$ | H | $R^{22} = -SO_2NH_2$ $-C_2H_4-OCH_3$ | H | Co | Y⁺-9 |
| I-27 | $R^{12} = -SO_2N(CH_3)_2$ | H | $R^{22} = -SO_2N(CH_3)_2$ | H | Co | Y⁺-9 |
| I-28 | $R^{13} = -N(C_2H_6)_2$ | H | $R^{23} = -N(C_2H_6)_2$ | H | Co | Y⁺-10 |
| I-29 | H | $R^{19} = -N(C_2H_6)_2$ | H | $R^{29} = -N(C_2H_6)_2$ | Co | Y⁺-11 |
| I-30 | H | $R^{19} = -N(C_2H_6)_2$ | H | $R^{29} = -N(C_2H_6)_2$ | Co | Y⁺-9 |
| I-31 | H | $R^{16} = NO_2$ | H | $R^{26} = NO_2$ | Co | Y⁺-10 |
| I-32 | H | $R^{18} = NO_2$ | H | $R^{28} = NO_2$ | Co | Y⁺-11 |
| I-33 | $R^{12} = t\text{-}C_4H_9$ | $R^{19} = Cl$ | $R^{22} = t\text{-}C_4H_9$ | $R^{29} = Cl$ | Co | Y⁺-9 |
| I-34 | H | $R^{19} = -OCH_3$ | H | $R^{29} = -OCH_3$ | Co | Y⁺-9 |

These metal-containing azo compounds can be synthesized in accordance with well-known publications, for example, JP-A 39328/1975, JP-A 151061/1980 (corresponding to West German Patent OS 29 18 634), West German Patent Nos. 12 60 652 and 12 26 727.

The metal-containing azo compounds of formula (IV) have a melting point (mp) of 100° to 300° C. and λmax in the range of 500 to 650 nm as measured on a dye thin film of 50 nm thick.

These compounds have a complex index of refraction as measured at 650 nm by the same procedure as previously described, whose real part n is 1.8 to 2.8 and whose imaginary part k is 0 to 0.30. The metal-containing azo compounds used herein are well soluble, especially in polar solvents. For example, 0.5 to 10% by weight of metal-containing azo compounds are soluble in alcohols, cellosolves, alkoxyalcohols, keto-alcohols such as diacetone alcohol, ketones such as cyclohexanone, and fluorinated alcohols such as 2,2,3,3-tetrafluoropropanol. Since more than 4% by weight of metal-containing azo compounds are soluble in ethyl cellosolve and 2,2,3,3-tetrafluoropropanol which are appropriate coating solvents particularly in coating on polycarbonate disc substrates, films of quality can be briefly formed by spin coating.

The metal-containing azo compounds may be used alone or in admixture of two or more. With respect to mixing with the trimethinecyanine dye, the molar ratio of metal-containing azo compound to trimethinecyanine dye is preferably from 10/90 to 95/5.

Also preferred for use as dye B in the practice of the invention is a sub-phthalocyanine boron complex of the following formula (V), that is, 15c-X substituted-triisoindolo[1,2,3-cd:1',2',3'-gh:1",2",3"-kl]-[2,3a,5a,6a,8,9a,9b]-hexaazaboraphenalene or a substituted one thereof.

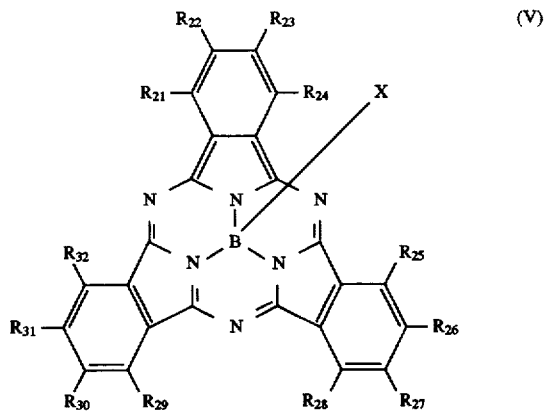

(V)

Formula (V) is described. Each of $R_{21}$ to $R_{32}$ stands to a hydrogen atom, halogen atom, alkyl, alkoxy, alkylthio, aryloxy or arylthio radical.

The halogen atoms represented by $R_{21}$ to $R_{32}$ include fluorine, chlorine, bromine and iodine atoms, with the chlorine and bromine atoms being preferred.

The alkyl radicals represented by $R_{21}$ to $R_{32}$ are preferably those having 1 to 15 carbon atoms, more preferably 1 to 12 carbon atoms, most preferably 1 to 10 carbon atoms in total. They may be either normal or branched, preferably branched. The branched alkyl radical preferably has 3 to 8 carbon atoms in total. Also a cycloalkyl radical is acceptable while a radical having a cycloalkyl radical is acceptable. The alkyl radical may have a substituent. Such substituents include halogen atoms (F, Cl, Br, etc.) and alkoxy radicals (methoxy, ethoxy, etc.). Examples of the alkyl radical are methyl (Me), ethyl (Et), n-propyl (n-Pr), isopropyl (i-Pr), n-butyl (n-Bu), isobutyl (i-Bu), s-butyl (s-Bu), t-butyl (t-Bu), n-pentyl, isopentyl, neopentyl, 1,2-dimethylpropyl, n-hexyl, cyclohexyl, 1,3-dimethylbutyl, 1-isopropylpropyl, 1,2-dimethylbutyl, 2-ethylbutyl, n-heptyl, 1,4-dimethylpentyl, 2-methyl-1-isopropylpropyl, 1-ethyl-3-methylbutyl, n-octyl, 2-ethylhexyl, 3-methyl-1-isopropylbutyl, 2-methyl-1-isopropylbutyl, 1-t-butyl-2-methylpropyl, n-nonyl, methoxymethyl, methoxyethyl, ethoxyethyl, propoxyethyl, butoxyethyl, methoxyethoxyethyl, ethoxyethoxyethyl, dimethoxymethyl, diethoxymethyl, dimethoxyethyl, diethoxyethyl, chloromethyl, 2,2,2-trichloroethyl, trifluoromethyl, and 1,1,1,3,3,3-hexafluoro-2-propyl radicals. Preferred are isopropyl, s-butyl and t-butyl radicals.

The alkoxy radicals represented by $R_{21}$ to $R_{32}$ may have a substituent (e.g., halogen atom) and their alkyl moiety is the same as the aforementioned alkyl radicals. Preferably the alkyl moiety has 1 to 15 carbon atoms, more preferably 1 to 12 carbon atoms, most preferably 3 to 12 carbon atoms in total. Preferred alkyl moieties are a branched alkyl radical having 3 to 8 carbon atoms and a cycloalkyl radical having a substituent, especially a normal or branched alkyl substituent having 1 to 6 carbon atoms. The cycloalkyl radical is preferably a cyclohexyl radical which may be substituted with a normal or branched alkyl radical having 2 or more carbon atoms, usually 2 to 10 carbon atoms in total. Especially preferred is a cycloalkane ring having a substituent at a position adjacent to the position of attachment to the oxy radical. Particularly when only one substituent is attached, a branched alkyl radical (having 3 to 6 carbon atoms) is preferred as the alkyl moiety.

Examples of the alkoxy radical are methoxy (OMe), ethoxy (OEt), n-propoxy (OPr(n-)), isopropoxy (OPr(i-)), n-butoxy (OBu(n-)), isobutoxy (OBu(i-)), s-butoxy (OBu(s-)), t-butoxy (OBu(t-)), 1,3-dimethylbutoxy, 3-methyl-1-isopropylbutoxy, 2-methyl-1-isopropylpropoxy, 2-ethylbutoxy, cyclohexyloxy, 2-t-butylcyclohexyloxy, 2-t-butyl-6-methylcyclohexyloxy, and 2,6-dimethylcyclohexyloxy radicals. Preferred among others are isopropoxy, isobutoxy, s-butoxy, t-butoxy, 1,3-dimethylbutoxy, 3-methyl-1-isopropylbutoxy, 2-methyl-1-isopropylpropoxy, 2-ethylbutoxy, 2-t-butylcyclohexyloxy, 2-t-butyl-6-methylcyclohexyloxy, and 2,6-dimethylcyclohexyloxy radicals.

The alkylthio radicals represented by $R_{21}$ to $R_{32}$ are those whose alkyl moiety is the same as the alkyl moiety of the alkoxy radicals mentioned above, with preferred ones being also the same. Illustrative examples are methylthio, ethylthio, propylthio, isopropylthio, n-butylthio, isobutylthio, s-butylthio, t-butylthio, cyclohexylthio, and 2-t-butylcyclohexylthio radicals. Preferred among others are isopropylthio, isobutylthio, s-butylthio, t-butylthio, and 2-t-butylcyclohexylthio radicals.

Preferred as the aryloxy radicals represented by $R_{21}$ to $R_{32}$ are those whose aryl moiety has 6 to 14 carbon atoms in total, may be monocyclic, fused polycyclic or ring fusion, is exemplified by phenyl, naphthyl and biphenyl radicals, and may further have a substituent (e.g., halogen atom, alkyl radical, etc.). The preferred aryl moiety is a monocyclic phenyl radical having a substituent at the ortho-position relative to the position of attachment of the benzene ring to the oxy radical. The substituent is preferably a normal or branched alkyl radical having 1 to 6 carbon atoms, the substituting normal or branched alkyl radical preferably has at least two carbon atoms, usually 2 to 10 carbon atoms in total. Particularly when only one substituent is attached, a branched alkyl radical (having 3 to 6 carbon atoms) is preferred.

While mention may be made of a phenoxy radical, preferred examples of the aryloxy radical include o-tolyloxy, 2-ethylphenyloxy, 2-n-propylphenyloxy, 2-isopropylphenyloxy, 2-n-butylphenyloxy, 2-isobutylphenyloxy, 2-s-butylphenyloxy, 2-t-butylphenyloxy, 2,4-di-t-butylphenyloxy, 2-t-butyl-6-methylphenyloxy, 2,6-di-t-butylphenyloxy, 2,4,6-tri-t-butylphenyloxy, 2-t-butyl-4-chloro-5-methylphenyloxy, 2,6-dimethylphenyloxy, 3-t-butylphenyloxy, 3-isopropylphenyloxy, 4-t-butylphenyloxy, 2-bromophenyloxy, and 2,3,4,5,6-pentafluorophenyloxy radicals. Especially preferred are 2-isopropylphenyloxy, 2-isobutylphenyloxy, 2-isobutylphenyloxy, 2-s-butylphenyloxy, 2-t-butylphenyloxy, 2,4-di-t-butylphenyloxy, 2-t-butyl-6-methylphenyloxy, 2,6-di-t-butylphenyloxy, 2,4,6-tri-t-butylphenyloxy, 2-t-butyl-4-chloro-5-methylphenyloxy, 2,6-dimethylphenyloxy, 3-t-butylphenyloxy, 2,6-dimethylphenyloxy, 3-t-butylphenyloxy, 3-isopropylphenyloxy, and 4-t-butylphenyloxy radicals.

The arylthio radicals represented by $R_{21}$ to $R_{32}$ are those whose aryl moiety is the same as the aryl moiety of the aryloxy radicals mentioned above, with preferred ones being also the same. Illustrative examples include phenylthio, o-tolylthio, 2-ethylphenylthio, 2-n-propylphenylthio, 2-isopropylphenylthio, 2-n-butylphenylthio, 2-isobutylphenylthio, 2-s-butylphenylthio, 2-t-butylphenylthio, and 2,4-di-t-butylphenylthio radicals. Preferred among others are 2-isopropylphenylthio, 2-isobutylphenylthio, 2-s-butylphenylthio, 2-t-butylphenylthio, and 2,4-di-t-butylphenylthio radicals.

$R_{21}$ to $R_{32}$ may be the same or different although it is preferred that at least one of them be a substituent such as halogen atom, alkyl, alkoxy, alkylthio, aryloxy and arylthio radicals. Further preferably a combination of $R_{21}$, $R_{25}$, and $R_{29}$ or a combination of $R_{22}$, $R_{26}$, and $R_{30}$ has three of the above-mentioned substituents. The substituents used herein are preferably alkyl, alkoxy and aryloxy radicals. The preferred alkyl radicals are branched alkyl radicals. The preferred alkoxy radicals are alkoxy radicals having a branched alkyl radical or cyclohexyloxy radicals having a substituent, specifically a cyclohexane ring having a substituent, typically an alkyl radical, especially a branched alkyl radical at a position adjacent to the position of attachment to the oxy radical. The preferred aryloxy radicals are phenyloxy radicals having a substituent, specifically a benzene ring having a substituent, typically an alkyl radical, especially a branched alkyl radical at an ortho-position relative to the position of attachment to the oxy radical.

Further referring to $R_{21}$ to $R_{32}$, adjacent ones in each of combinations $R_{21}$ to $R_{24}$, $R_{25}$ to $R_{28}$, and $R_{29}$ to $R_{32}$ may bond together to form a fused ring. The fused ring is preferably a carbocyclic ring, especially a benzene ring.

Most preferably, $R_{22}$ and $R_{23}$, $R_{26}$ and $R_{27}$, and $R_{30}$ and $R_{31}$, taken together, form a bond.

It is understood that with respect to $R_{21}$ to $R_{32}$ in formula (V), a combination of $R_{21}$ to $R_{24}$, a combination of $R_{25}$ to $R_{28}$, and a combination of $R_{29}$ to $R_{32}$ are equivalent to each other among these three combinations, while $R_{21}$ and $R_{24}$, and $R_{22}$ and $R_{23}$ in the combination of $R_{21}$ to $R_{24}$, $R_{25}$ and $R_{28}$, and $R_{26}$ and $R_{27}$ in the combination of $R_{25}$ to $R_{28}$, and $R_{29}$ and $R_{32}$, and $R_{30}$ and $R_{31}$ in the combination of $R_{29}$ to $R_{32}$ are equivalent to each other.

In formula (V), X is a halogen atom, hydroxyl, alkoxy, phenoxy or phenyl radical.

The halogen atom represented by X includes fluorine, chlorine and bromine atoms, with the bromine atom being preferred.

The alkoxy radicals represented by X are preferably chainlike radicals having 1 to about 8 carbon atoms in total which may be normal or branched. Unsubstituted ones are preferred although substituted ones are also acceptable. Illustrative preferred examples include methoxy, ethoxy, n-propoxy, isopropoxy, n-butoxy, isobutoxy, s-butoxy, and t-butoxy radicals.

The phenoxy and phenyl radicals represented by X are preferably unsubstituted ones although substituted ones are also acceptable.

Examples of the compound of formula (V) are shown below although the invention is not limited thereto. Below, examples are shown by a combination of $R_{21}$ to $R_{32}$ and X in formula (V).

| Compound No. | $R_{21} = R_{25} = R_{29}$ | $R_{22} = R_{26} = R_{30}$ | $R_{23} = R_{27} = R_{31}$ | $R_{24} = R_{28} = R_{32}$ | X | MS (M$^+$) |
|---|---|---|---|---|---|---|
| 1 | H | H | H | H | Cl | 430 |
| 2 | H | H | H | H | F | 414 |
| 3 | H | H | H | H | Br | 475 |
| 4 | H | H | H | H | OEt | 440 |
| 5 | H | H | H | H | OBu(t-) | 468 |
| 6 | Me | H | H | H | Br | 517 |
| 7 | Et | H | H | H | Br | 559 |
| 8 | n-Pr | H | H | H | Br | 601 |
| 9 | i-Pr | H | H | H | Br | 601 |
| 10 | n-Bu | H | H | H | Br | 643 |
| 11 | s-Bu | H | H | H | Br | 643 |
| 12 | t-Bu | H | H | H | Br | 643 |
| 13 | Cl | H | H | H | Br | 577 |
| 14 | F | H | H | H | Br | 529 |
| 15 | Br | H | H | H | Br | 712 |
| 16 | CF$_3$ | H | H | H | Br | 679 |
| 17 | F | F | F | F | Br | 691 |
| 18 | Cl | Cl | Cl | Cl | Br | 883 |
| 19 | Br | Br | Br | Br | Br | 1423 |
| 20 | —OMe | H | H | H | Br | 565 |
| 21 | —OEt | H | H | H | Br | 607 |
| 22 | —OPr(n-) | H | H | H | Br | 649 |
| 23 | —OPr(i-) | H | H | H | Br | 649 |
| 24 | —OBu(n-) | H | H | H | Br | 691 |
| 25 | —OBu(s-) | H | H | H | Br | 691 |
| 26 | —OBu(t-) | H | H | H | Br | 691 |
| 27 | —O—CH—CH$_2$—(CH$_3$)$_2$<br>\|<br>Me | H | H | H | Br | 775 |
| 28 | —O—CHCH(CH$_3$)$_2$<br>\|<br>CH$_2$CH(CH$_3$)$_2$ | H | H | H | Br | 859 |
| 29 | —O—CH[CH(CH$_3$)$_2$]$_2$ | H | H | H | Br | 817 |

-continued
| Compound No. | $R_{21} = R_{25} = R_{29}$ | $R_{22} = R_{26} = R_{30}$ | $R_{23} = R_{27} = R_{31}$ | $R_{24} = R_{28} = R_{32}$ | X | MS (M+) |
|---|---|---|---|---|---|---|
| 30 | —O—CH$_2$CH(C$_2$H$_5$)—C$_2$H$_5$ | H | H | H | Br | 775 |
| 31 | 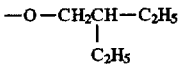 2-Me-C$_6$H$_4$-O— | H | H | H | Br | 793 |
| 32 | 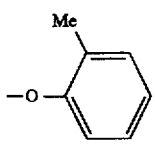 2-Et-C$_6$H$_4$-O— | H | H | H | Br | 835 |
| 33 | 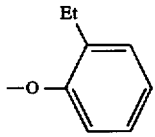 2-n-Pr-C$_6$H$_4$-O— | H | H | H | Br | 877 |
| 34 | 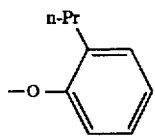 2-i-Pr-C$_6$H$_4$-O— | H | H | H | Br | 877 |
| 35 | 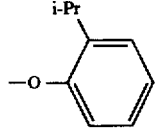 2-n-Bu-C$_6$H$_4$-O— | H | H | H | Br | 919 |
| 36 | 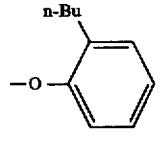 2-s-Bu-C$_6$H$_4$-O— | H | H | H | Br | 919 |
| 37 | 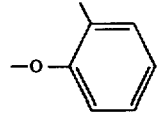 2-t-Bu-C$_6$H$_4$-O— | H | H | H | Br | 919 |
| 38 | 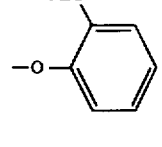 2,4-di-t-Bu-C$_6$H$_3$-O— | H | H | H | Br | 1087 |
| 39 | 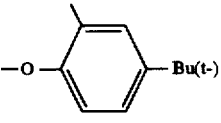 2-t-Bu-6-Me-C$_6$H$_3$-O— | H | H | H | Br | 961 |

-continued

| Compound No. | $R_{21} = R_{25} = R_{29}$ | $R_{22} = R_{26} = R_{30}$ | $R_{23} = R_{27} = R_{31}$ | $R_{24} = R_{28} = R_{32}$ | X | MS (M⁺) |
|---|---|---|---|---|---|---|
| 40 | —O—(2,6-di-t-Bu-phenyl) | H | H | H | Br | 1087 |
| 41 | —O—(2,4,6-tri-t-Bu-phenyl) | H | H | H | Br | 1255 |
| 42 | —O—(5-t-Bu-2-Cl-3-Me-phenyl) | H | H | H | Br | 1063 |
| 43 | —O—(2,6-di-Me-phenyl) | H | H | H | Br | 835 |
| 44 | —O—(3-t-Bu-phenyl) | H | H | H | Br | 919 |
| 45 | —O—(3-i-Pr-phenyl) | H | H | H | Br | 877 |
| 46 | —O—(4-t-Bu-phenyl) | H | H | H | Br | 919 |
| 47 | —O—(2-Br-phenyl) | H | H | H | Br | 988 |
| 48 | —O—(2,3,4,5-tetra-F-phenyl) | H | H | H | Br | 1021 |

-continued

| Compound No. | $R_{21} = R_{25} = R_{29}$ | $R_{22} = R_{26} = R_{30}$ | $R_{23} = R_{27} = R_{31}$ | $R_{24} = R_{28} = R_{32}$ | X | MS (M$^+$) |
|---|---|---|---|---|---|---|
| 49 | t-Bu, —O-(cyclohexyl with H) | H | H | H | Br | 937 |
| 50 | t-Bu, —O-(cyclohexyl with H, Me) | H | H | H | Br | 979 |
| 51 | Me, —O-(cyclohexyl with H, Me) | H | H | H | Br | 853 |
| 52 | H | Me | H | H | Br | 517 |
| 53 | H | Et | H | H | Br | 559 |
| 54 | H | n-Pr | H | H | Br | 601 |
| 55 | H | i-Pr | H | H | Br | 601 |
| 56 | H | n-Bu | H | H | Br | 643 |
| 57 | H | s-Bu | H | H | Br | 643 |
| 58 | H | t-Bu | H | H | Br | 643 |
| 59 | H | Cl | H | H | Br | 577 |
| 60 | H | F | H | H | Br | 529 |
| 61 | H | Br | H | H | Br | 712 |
| 62 | H | CF$_3$ | H | H | Br | 679 |
| 63 | H | —OMe | H | H | Br | 565 |
| 64 | H | —OEt | H | H | Br | 607 |
| 65 | H | —OPr(n-) | H | H | Br | 649 |
| 66 | H | —OPr(i-) | H | H | Br | 649 |
| 67 | H | —OBu(n-) | H | H | Br | 691 |
| 68 | H | —OBu(s-) | H | H | Br | 691 |
| 69 | H | —OBu(t-) | H | H | Br | 691 |
| 70 | H | —O—CH(Me)—CH$_2$—(CH$_3$)$_2$ | H | H | Br | 775 |
| 71 | H | —O—CH(CH$_2$CH(CH$_3$)$_2$)CH(CH$_3$)$_2$ | H | H | Br | 859 |
| 72 | H | —O—CH[CH(CH$_3$)$_2$]$_2$ | H | H | Br | 817 |
| 73 | H | —O—CH$_2$CH(C$_2$H$_5$)—C$_2$H$_5$ | H | H | Br | 775 |
| 74 | H | —O-(phenyl with Me) | H | H | Br | 793 |
| 75 | H | —O-(phenyl with Et) | H | H | Br | 835 |

-continued

| Compound No. | $R_{21} = R_{25} = R_{29}$ | $R_{22} = R_{26} = R_{30}$ | $R_{23} = R_{27} = R_{31}$ | $R_{24} = R_{28} = R_{32}$ | X | MS (M$^+$) |
|---|---|---|---|---|---|---|
| 76 | H | n-Pr — O — (phenyl) | H | H | Br | 877 |
| 77 | H | i-Pr — O — (phenyl) | H | H | Br | 877 |
| 78 | H | n-Bu — O — (phenyl) | H | H | Br | 919 |
| 79 | H | s-Bu — O — (phenyl) | H | H | Br | 919 |
| 80 | H | t-Bu — O — (phenyl) | H | H | Br | 919 |
| 81 | H | t-Bu — O — (phenyl) — Bu(t-) | H | H | Br | 1087 |
| 82 | H | t-Bu — O — (phenyl) — Me | H | H | Br | 961 |
| 83 | H | t-Bu — O — (phenyl) — t-Bu | H | H | Br | 1087 |
| 84 | H | t-Bu — O — (phenyl) — Bu(t-), t-Bu | H | H | Br | 1255 |

-continued
| Compound No. | $R_{21} = R_{25} = R_{29}$ | $R_{22} = R_{26} = R_{30}$ | $R_{23} = R_{27} = R_{31}$ | $R_{24} = R_{28} = R_{32}$ | X | MS (M+) |
|---|---|---|---|---|---|---|
| 85 | H | 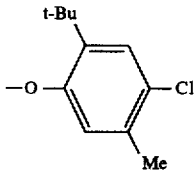 | H | H | Br | 1063 |
| 86 | H | 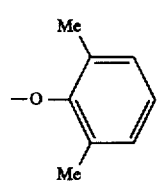 | H | H | Br | 835 |
| 87 | H | 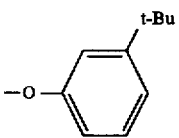 | H | H | Br | 919 |
| 88 | H | 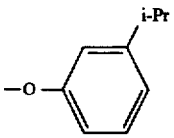 | H | H | Br | 877 |
| 89 | H | 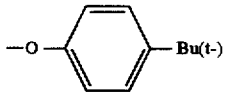 | H | H | Br | 919 |
| 90 | H | 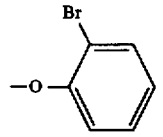 | H | H | Br | 988 |
| 91 | H | 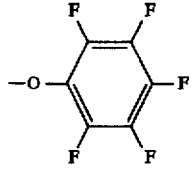 | H | H | Br | 1021 |
| 92 | H | 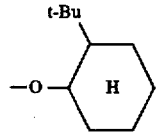 | H | H | Br | 937 |
| 93 | H | 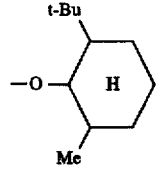 | H | H | Br | 979 |

-continued

| Compound No. | $R_{21} = R_{25} = R_{29}$ | $R_{22} = R_{26} = R_{30}$ | $R_{23} = R_{27} = R_{31}$ | $R_{24} = R_{28} = R_{32}$ | X | MS (M$^+$) |
|---|---|---|---|---|---|---|
| 94 | H | —O—(2,6-dimethylcyclohexyl) | H | H | Br | 853 |
| 95 | H | —S—C$_6$H$_{13}$(n-) | —S—C$_6$H$_{13}$(n-) | H | Cl | 1126 |
| 96 | H | —S—C$_6$H$_{13}$(n-) | —S—C$_6$H$_{13}$(n-) | H | Br | 1171 |
| 97 | H | t-Bu | H | H | Ph | 640 |
| 98 | t-Bu | H | H | H | Ph | 640 |
| 99 | H | OBu(t-) | H | H | Ph | 688 |
| 100 | OBu(t-) | H | H | H | Ph | 688 |
| 101 | OBu(t-) | H | H | H | OH | 628 |
| 102 | H | OBu(t-) | H | H | OH | 628 |
| 103 | H | OBu(t-) | H | H | OPh | 704 |
| 104 | OBu(t-) | H | H | H | OPh | 704 |
| 105 | —O—(2-t-Bu-phenyl) | H | H | H | OPh | 932 |
| 106 | H | —O—(2-t-Bu-phenyl) | H | H | OPh | 932 |
| 107 | —O—(2-t-Bu-4-t-Bu-phenyl) | H | H | H | OPh | 1100 |
| 108 | H | —O—(2-t-Bu-4-t-Bu-phenyl) | H | H | OPh | 1100 |
| 109 | OBu(t-) | H | H | H | OEt | 656 |
| 110 | H | OBu(t-) | H | H | OEt | 656 |
| 111 | —O—(2-t-Bu-phenyl) | H | H | H | OEt | 884 |
| 112 | H | —O—(2-t-Bu-phenyl) | H | H | OEt | 884 |
| 113 | —O—(2-t-Bu-4-t-Bu-phenyl) | H | H | H | OEt | 1052 |

-continued
| Compound No. | $R_{21} = R_{25} = R_{29}$ | $R_{22} = R_{26} = R_{30}$ | $R_{23} = R_{27} = R_{31}$ | $R_{24} = R_{28} = R_{32}$ | X | MS (M⁺) |
|---|---|---|---|---|---|---|
| 114 | H | t-Bu 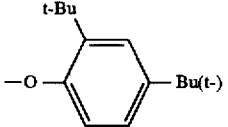 | H | H | OEt | 1052 |
| 115 | SBu(t-) | H | H | H | Br | 739 |
| 116 | H | SBu(t-) | H | H | Br | 739 |
| 117 | 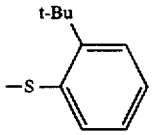 | H | H | H | Br | 967 |
| 118 | H | 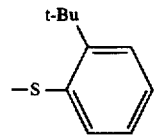 | H | H | Br | 967 |
| 119 | 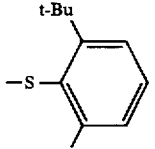 | H | H | H | Br | 1135 |
| 120 | H | 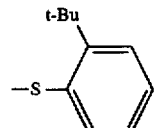 | H | H | Br | 1135 |

| Compound No. | R21 | R22 | R23 | R24 | R25 | R26 | R27 | R28 | R29 | R30 | R31 | R32 | X | MS (M+) |
|---|---|---|---|---|---|---|---|---|---|---|---|---|---|---|
| 121 | 2-t-BuO-C6H4 | H | H | H | H | 2-t-BuO-C6H4 | H | H | 2-t-BuO-C6H4 | H | H | H | Br | 919 |
| 122 | H | 2-t-BuO-C6H4 | H | H | H | 2-t-BuO-C6H4 | H | H | 2-t-BuO-C6H4 | H | H | H | Br | 919 |
| 123 | 2-t-BuO-C6H4 | H | H | H | 2-s-BuO-C6H4 | H | H | H | 2-t-BuO-C6H4 | H | H | H | Br | 919 |
| 124 | H | H | H | H | H | H | H | H | 2-t-BuO-C6H4 | H | H | H | Br | 623 |
| 125 | 2-t-BuO-C6H4 | H | H | H | H | H | H | H | 2-t-BuO-C6H4 | H | H | H | Br | 771 |

-continued

| Compound No. | R₂₁ | R₂₂ | R₂₃ | R₂₄ | R₂₅ | R₂₆ | R₂₇ | R₂₈ | R₂₉ | R₃₀ | R₃₁ | R₃₂ | X | MS (M⁺) |
|---|---|---|---|---|---|---|---|---|---|---|---|---|---|---|
| 126 | —OBu(t-) | H | H | H | cyclohexyl with t-Bu and —O— substituents | H | H | H | phenyl with t-Bu and —O— substituents | H | H | H | Br | 849 |
| 127 | H | H | R₂ and R₃ form a fused benzene ring | H | —O—Bu(t-) | H | H | H | —O—Bu(t-) | H | H | H | Br | 669 |
| 128 | H | H | R₂ and R₃ form a fused benzene ring | H | H | H | R₆ and R₇ form a fused benzene ring | H | phenyl with two t-Bu and —O— substituents | H | H | H | Br | 779 |

The compounds of formula (I) can be synthesized in accordance with or in substantial accordance with the processes described in JP-A 9882/1990, JP-A 102251/1995; A. Meller, A. Ossko, Monatshe fur Chemie, 103, 150 (1972); S. Dabak, A. Gul, O. Beharoglu, Chem. Ber., 127, 2009 (1994); M. Hanack, M. Geyer, Chem. Soc. Chem. Commun., 2253 (1994); N. Kobayashi, R. Kondo, S. Nakajima, T. Osa, J. Am. Chem. Soc., 112, 9640 (1990); N. Kobayashi, J. Chem. Soc., Chem. Commun., 1203 (1991); K. Kosuga, T. Idehara, M. Handa, Inorg. Chimi. Acta., 196, 127 (1992) and the references cited in these articles.

Synthetic examples are given below.

SYNTHESIS EXAMPLE A

Synthesis of Compound No. 38

In 5 ml of dimethylformamide (DMF) with 5.0 grams of $K_2CO_3$ added, 1.73 grams of 1,2-dicyano-3-nitrobenzene and 4.12 grams of 2,4-di-t-butyl-hydroxybenzene were reacted for 2 hours at 80° C. At the end of reaction, the reaction solution was extracted twice with a solvent mixture of water/ethyl acetate (volume ratio 1/1), the ethyl acetate extract layer was dried overnight over $MgSO_4$, and the ethyl acetate was distilled off. The product was separated and purified by silica gel column chromatography using chloroform, obtaining 2.65 grams of 1,2-dicyano-3-(2,4-t-butylphenyloxy)benzene (yield of 80%).

Next, 1.66 grams of this benzene compound and 0.42 gram of $BBr_3$ were reacted in 10 ml of 1-chloronaphthalene by heating at 180° C. for 10 minutes. The reaction product was separated by silica gel column chromatography, obtaining 1.2 grams of the end product (yield 66%, mp 160° C.).

SYNTHESIS EXAMPLE B

Synthesis of Compound No. 50

As in Synthesis Example 1 but using 1.73 grams of 1,2-dicyano-3-nitrobenzene and 3.40 grams of 2-t-butyl-6-methylcyclohexanol, there was obtained 1.48 grams of 1,2-dicyano-3-(2-t-butyl-6-methylcyclohexyloxy)benzene (yield of 50%). Next, as in Synthesis Example 1 but using 1.48 grams of this benzene compound and 0.42 gram of $BBr_3$, there was obtained 1.1 grams of the end product (yield 68%, mp 154°–155° C.).

SYNTHESIS EXAMPLE C

Synthesis of Compound No. 26

As in Synthesis Example 1 but using 1.73 grams of 1,2-dicyano-3-nitrobenzene and 2.20 grams of t-butylalcohol, there was obtained 1.40 grams of 1,2-dicyano-3-t-butoxybenzene (yield of 70%). Next, as in Synthesis Example 1 but using 1.40 grams of this benzene compound and 0.58 gram of $BBr_3$, there was obtained 2.9 grams of the end product (yield 60%, mp 184°–186° C.).

SYNTHESIS EXAMPLE D

Synthesis of Compound No. 80

As in Synthesis Example 1 but using 1.73 grams of 1,2-dicyano-4-nitrobenzene and 3.0 grams of 2-t-butyl-hydroxybenzene, there was obtained 2.2 grams of 1,2-dicyano-4-(2-t-butylphenyloxy)benzene (yield of 80%). Next, as in Synthesis Example 1 but using 1.38 grams of this benzene compound and 0.42 gram of $BBr_3$, there was obtained 0.77 gram of the end product (yield 50%, mp 163°–165° C.).

SYNTHESIS EXAMPLE E

Synthesis of Compound No. 92

As in Synthesis Example 1 but using 1.73 grams of 1,2-dicyano-4-nitrobenzene and 4.7 grams of 2-t-butylcyclohexanol, there was obtained 1.41 grams of 1,2-dicyano-4-(2-t-butylcyclohexyloxy)benzene (yield of 50%). Next, as in Synthesis Example 1 but using 1.41 grams of this compound and 0.42 gram of $BBr_3$, there was obtained 0.77 gram of the end product (yield 50%, mp 162°–165° C.).

SYNTHESIS EXAMPLE F

Synthesis of Compound No. 106

The end product was obtained by mixing a 1-chloronaphthalene solution of compound No. 80 with a large excess of phenol and heating at a temperature of 50° C.

SYNTHESIS EXAMPLE G

Synthesis of Compound No. 113

The end product was obtained by mixing a 1-chloronaphthalene solution of compound No. 38 with a large excess of ethanol and heating at a temperature of 80° C.

SYNTHESIS EXAMPLE H

Synthesis of Compound No. 117

As in Synthesis Example 1 but using 1.73 grams of 1,2-dicyano-4-nitrobenzene and 4.9 grams of 2-t-butylbenzenethiol, there was obtained 1.46 grams of 1,2-dicyano-3-(2-t-butylphenylthio)benzene (yield of 50%). Next, as in Synthesis Example 1 but using 1.46 grams of this benzene compound and 0.42 gram of $BBr_3l$ there was obtained 0.73 gram of the end product (yield 45%, mp 160°–161° C.).

SYNTHESIS EXAMPLE I

Synthesis of Compound No. 121

As in Synthesis Example 1 but using 0.69 gram of 1,2-dicyano-3-(2-t-butylphenyloxy)benzene, 0.69 gram of 1,2-dicyano-4-(2-t-butylphenyloxy)benzene, and 0.42 gram of $BBr_3l$ there was obtained 1.07 grams of the end product (yield 70%, mp 156°–159° C.).

SYNTHESIS EXAMPLE J

Synthesis of Compound No. 128

As in Synthesis Example 1 but using 0.45 gram of 2,3-dicyanonaphthalene, 0.83 gram of 1,2-dicyano-3-(2,6-t-butylphenyloxy)benzene, and 0.42 gram of $BBr_3$, there was obtained 0.93 grams of the end product (yield 72%, mp 178°–184° C.).

Other exemplary compounds were similarly synthesized. These compounds could be identified by a mass spectrum, infrared absorption spectrum (IR), nuclear magnetic resonance spectrum (NMR), etc. Among these analyses, a molecular ion peak $M^+$ of mass spectrum (MS) is reported along with an exemplary compound.

These compounds are fully soluble in organic solvents and have an increased solubility in a coating solvent which does not attack polycarbonate (PC) resins commonly used as the substrate material of optical recording media.

These compounds have a melting point (mp) of 120 to 250° C. and λmax (in toluene) in the range of 520 to 630 nm.

With respect to n and k at 630 nm or 650 nm, they have n of 1.8 to 2.6 and k of 0 to 0.40. Table 5 shows λmax and n and k at 630 nm or 650 nm of some of these compounds (as measured on a dye film of 80 nm thick).

TABLE 5

| Dye No. | n | k | (measuring wavelength, nm) | λmax, nm |
| --- | --- | --- | --- | --- |
| 9 | 2.10 | 0.05 | (650) | 603 |
| 11 | 2.10 | 0.07 | (650) | 605 |
| 12 | 2.05 | 0.07 | (650) | 605 |
| 23 | 2.15 | 0.04 | (650) | 600 |
| 25 | 2.15 | 0.06 | (650) | 598 |
| 26 | 2.15 | 0.06 | (650) | 600 |
| 27 | 2.05 | 0.03 | (650) | 605 |
| 28 | 2.20 | 0.06 | (650) | 607 |
| 29 | 2.15 | 0.06 | (650) | 605 |
| 30 | 2.10 | 0.06 | (650) | 602 |
| 36 | 2.35 | 0.05 | (650) | 609 |
| 37 | 2.40 | 0.12 | (630) | 607 |
| 38 | 2.30 | 0.14 | (650) | 610 |
| 39 | 2.35 | 0.02 | (650) | 600 |
| 49 | 2.30 | 0.09 | (650) | 601 |
| 50 | 2.35 | 0.12 | (630) | 597 |

Along with the compound of formula (V), a metal complex quencher as mentioned previously may be used in order to improve light resistance. Among others, metal complex quenchers of the bisphenyldithiol system are preferred, and the center metal is, for example, Ni, Cu, Co, Pd, and Pt, with Ni and Cu being preferred.

The amount of the quencher used is preferably 0.5 to 30% by weight of the compound of formula (V).

The recording layers using dyes A and B are especially preferred for use in write-once type optical recording discs (CD-R). Such a recording layer is preferably formed by applying a dye-containing coating solution by such techniques as spin coating, screen printing, spray coating and spray coating. Especially preferred is a spin coating technique of applying and spreading a coating solution onto a rotating substrate.

Herein, the coating solvent used may be suitably selected from alcohol solvents (including keto-alcohols and ethylene glycol monoalkyl ethers), aliphatic hydrocarbon solvents, ketone solvents, ester solvents, ether solvents, aromatic solvents, halogenated alkyl solvents, etc. The recording layer A containing dye A and the recording layer B containing dye B are preferably coated using immiscible solvents for the purpose of preventing the interface between the recording layers from being disordered. It is preferred that the solubility (at 25° C.) of the coating solvent B for the recording layer B in the coating solvent A for the recording layer A (or of solvent A in solvent B) be 1% by weight or less. Also, it is preferred that dye A be soluble in solvent A (solubility at 25° C.: about 0.1 to 10% by weight), but dye B be substantially insoluble as demonstrated by a solubility at 25° C. of dye B in solvent A of less than 0.05% by weight, more preferably 0 to 0.03% by weight. It is additionally preferred that dye B be soluble in solvent B (solubility at 25° C.: about 0.1 to 10% by weight), but dye A be substantially insoluble as demonstrated by a solubility at 25° C. of dye A in solvent B of less than 0.05% by weight, more preferably 0 to 0.03% by weight. More specifically, it is preferred that the solvent for dissolving dye A be a nonpolar solvent and the solvent for dissolving dye B be a polar solvent.

The nonpolar solvent may be selected from aliphatic hydrocarbon solvents while the polar solvent may be selected from alcohol solvents (including keto-alcohols and alkoxy-alcohols such as ethylene glycol monoalkyl ethers), ketone solvents, ester solvents, ether solvents, aromatic solvents, halogenated alkyl solvents, etc.

Among these, aliphatic hydrocarbon solvents are preferred nonpolar solvents, and alcohol solvents are preferred polar solvents. Preferred for the aliphatic hydrocarbon solvent are n-hexane, cyclohexane, methylcyclohexane, ethylcyclohexane, cyclooctane, dimethylcyclohexane, n-octane, isopropylcyclohexane and t-butylcyclohexane, among which methylcyclohexane, ethylcyclohexane and dimethylcyclohexane are most preferable. Preferable alcohol solvents are alkoxy-alcohols and keto-alcohols. In the preferred alkoxy-alcohols, the alkoxy moiety has 1 to 4 carbon atoms, the alcohol moiety has 1 to 5 carbon atoms, especially 2 to 5 carbon atoms, and the total number of carbon atoms is 3 to 7. Examples include ethylene glycol monomethyl ether (methyl cellosolve), ethylene glycol monoethyl ether (ethyl cellosolve also known as ethoxyethanol), butyl cellosolve, ethylene glycol monoalkyl ethers (cellosolves) such as 2-isopropoxy-1-ethanol, 1-methoxy-2-propanol, 1-methoxy-2-butanol, 3-methoxy-1-butanol, 4-methoxy-1-butanol, and 1-ethoxy-2-propanol. An exemplary keto-alcohol is diacetone alcohol. Fluorinated alcohols such as 2,2,3,3-tetrafluoropropanol are also useful.

The nonpolar solvents and polar solvents may be used alone or in admixture of two or more.

It is noted that in the event wherein a dye for one layer is dissolved in a coating solvent for another layer so that formation of a layered film is difficult as occurring when the dye in a dye film coated as the lower layer is dissolved in a solvent used for the coating of a dye film as the upper layer, or in the event wherein a choice of mutually immiscible solvents is difficult because of the solubility of a dye in a solvent, an intermediate layer is interleaved between a dye film and another dye film to be stacked thereon for preventing intermixing of the dyes. This intermediate layer will be described later. One exemplary situation wherein such an intermediate layer is provided is found when a coating of a phthalocyanine dye as mentioned above is formed on a dye film of a sub-phthalocyanine boron complex as mentioned above, using ethylcyclohexane etc.

After spin coating as mentioned above has been completed, the coating is dried, if required. The thus formed recording layers have usually a total thickness of about 60 to 350 µm (600 to 3,500 Å) on the average as previously mentioned although it may be appropriately determined depending on the desired reflectance etc.

It is understood that the dye content of the coating solution is preferably 0.05 to 10% by weight, more preferably 0.08 to 10% by weight although it may be appropriately selected in accordance with the thickness of a dye film. The coating solution may optionally contain binders, dispersants, etc. in addition to the above-mentioned stabilizers.

Figure 2:
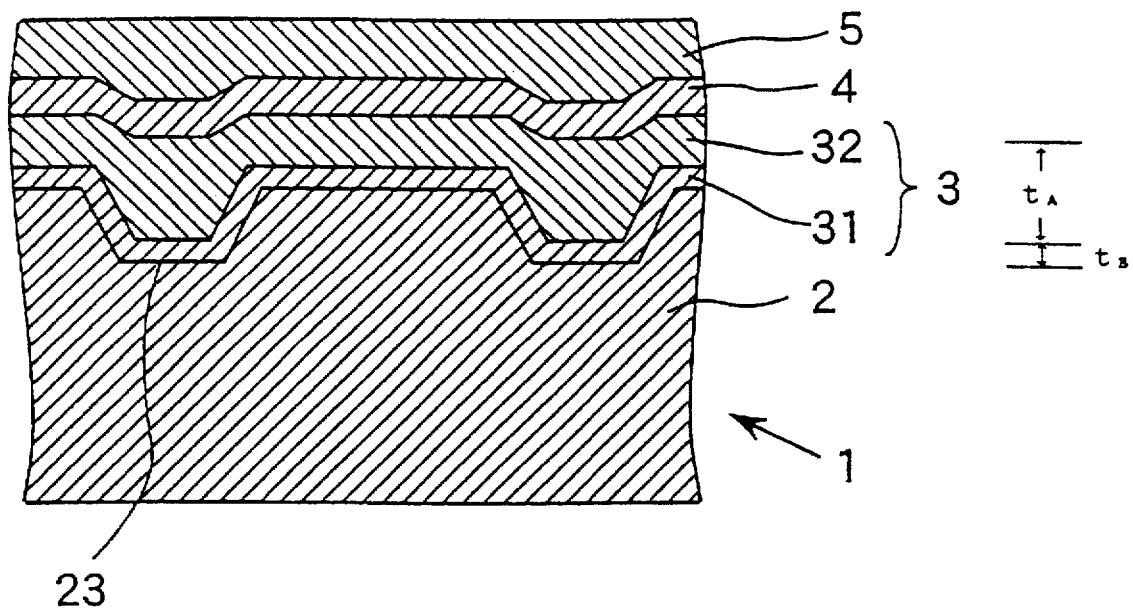
FIG. 2 is a fragmental cross-sectional view of an optical recording disc according to one embodiment of the invention.

One embodiment of the optical recording disc having such dye films on a substrate as a recording layer is schematically illustrated in FIG. 2. FIG. 2 is a sectional view of part of that embodiment. The optical recording disc 1 shown in FIG. 2 is a close contact type optical recording disc which has a reflective layer on a recording layer in close contact relationship and enables reading according to the CD standard. As illustrated, the optical recording disc 1 includes a recording layer 3 of the layered structure composed mainly of such dyes as mentioned above, which is formed on the surface of a substrate 2, a reflective layer 4 in close contact with the recording layer 3, and a protective layer 5. The recording layer 3 includes a first recording layer 31 containing dye B (or recording layer B) on the substrate 2 and a second recording layer 32 containing dye A (or recording layer A) thereon.

The substrate 2 is in a disc form and, to enable write and read from the back surface of the substrate, is preferably formed of a resin or glass material which is substantially transparent to writing and reading light (laser light having a wavelength of about 500 nm to about 900 nm, typically about 500 nm to about 680 nm, inter alia about 580 to 680 nm, especially 630 to 680 nm, and laser light having a wavelength of about 680 nm to about 900 nm, inter alia, laser light having a wavelength of about 680 nm to about 780 nm and semiconductor laser light having a wavelength of about 770 nm to about 900 nm, especially 635 nm, 650 nm and 780 nm) or in another parlance, has a transmittance of at least 88%. With respect to dimensions, the disc has a diameter of about 64 mm to about 200 mm and a thickness of about 1.2 mm.

On the surface of the substrate 2 where the recording layer 3 is formed, a groove 23 is formed for tracking purposes, as shown in FIG. 2. The groove 23 is preferably a continuous spiral groove having a depth of 0.1 to 0.25 μm, a width of 0.25 to 0.80 μm, more preferably 0.35 to 0.60 μm, and a groove pitch of 1 to 1.7 μm. Such groove configuration enables good-enough tracking signals to be obtained without a lowering of the reflection level of the groove area. It is particularly important to limit groove width to 0.25 to 0.80 μm. A groove width of less than 0.25 μm makes it difficult to obtain tracking signals of sufficient magnitude, resulting in an increased jitter even when tracking is slightly offset during recording. A groove width of more than 0.80 μm has a likelihood that read signals are subject to waveform distortion, causing an increased crosstalk.

The substrate 2 is preferably formed of resins, typically thermoplastic resins such as polycarbonate resins, acrylic resins, amorphous polyolefins, TPX and polystyrene resins. Using these resins, the substrate can be prepared by well-known techniques such as injection molding. Preferably, the groove 23 should be formed simultaneously with the molding of the substrate 2. Alternatively, a resin layer having the groove 23 may be formed by 2P or other methods after the fabrication of the substrate 2. Also, a glass substrate is useful as the case may be.

As shown in FIG. 2, the recording layer 3 deposited on the substrate 2 is formed using the above-mentioned dye-containing coating solution, preferably by spin coating as mentioned previously. Spin coating may be carried out from the inner to the outer periphery under conventional conditions while the number of revolutions is adjusted between 500 rpm and 5,000 rpm.

Preferably, the thus formed recording layer 3 has an as-dried thickness of 60 to 350 nm (600 to 3,500 Å) on the average. A departure from this range gives rise to a reflectance drop, rendering it difficult to read according to the CD standard. A very high degree of modulation is obtained when the thickness of the tracking area of the recording layer 3 within the groove 23 is kept at 100 nm (1,000 Å) or more, especially, at 120 nm (1,200 Å) or more. It is to be noted that the first recording layer 31 (or recording layer B) has a thickness $t_B$ in the groove 23 of about 15 to 120 nm (150 to 1,200 Å) and the second recording layer 32 (or recording layer A) has a thickness $t_A$ in the groove 23 of about 60 to 300 nm (600 to 3,000 Å) as previously mentioned.

As previously mentioned, in the event wherein dye B in the first recording layer 31 (or recording layer B) (e.g., sub-phthalocyanine boron complex) can be dissolved in a solvent used for the coating of the second recording layer 32 (or recording layer A) (e.g., ethylcyclohexane used for the coating of a phthalocyanine dye), or in the event wherein a choice of mutually immiscible solvents is difficult because of the solubility of dyes used, an intermediate layer is preferably interleaved between the first recording layer 31 (or recording layer B) and the second recording layer 32 (or recording layer A). The intermediate layer is not limited in material and formation process insofar as it has a function capable of preventing intermixing of dyes in the first and second recording layers 31 and 32 in the coating process and does not adversely affect their function as a recording layer. Most often, inorganic materials such as $SiO_2$ and SiN are used. No particular limit is imposed on the formation process although sputtering is preferred in that a uniform thin film is obtained. The intermediate layer may have a constant thickness of about 5 to 50 nm (50 to 500 Å) throughout the groove and land areas.

As shown in FIG. 2, the reflective layer 4 is formed on the recording layer 3 in direct contact relation thereto. Preferably, the reflective layer 4 is formed of a high-reflectance metal or alloy such as Au, Cu, Al and CuAg. The reflective layer 4 preferably has a thickness of at least 500 Å, and may be formed as by evaporation and sputtering. The upper limit of thickness is not critical, although it is preferably about 1,200 Å or less when cost, production time and other factors are taken into account. Then the reflective layer itself has a reflectance of at least 90%, and the reflectance of an unrecorded area of the medium through the substrate can be at least 60%, especially at least 70% at a wavelength of about 780 nm.

As shown in FIG. 2, the protective layer 5 is formed on the reflective layer 4. The protective layer 5 is formed of various resin materials such as UV curable resins, for instance, and usually has a thickness of about 0.5 μm to about 100 μm. The protective layer 5 may be in a layer or sheet form. The protective layer 5 may be formed by conventional processes such as spin coating, gravure coating, spray coating and dipping.

Recording or additional writing may be carried out on the optical recording disc 1 of such construction by directing recording light having a wavelength of 780 nm or 635 nm or 650 nm, for example, in pulse form to the recording layer 3 through the substrate 2 to form an irradiated spot where optical reflectance is changed. Upon irradiation of recording light, the recording layer 3 absorbs light so that it is heated while the substrate 2 is heated at the same time. As a result, the materials of the recording layer such as the dyes melt or decompose in the vicinity of the interface between the substrate 2 and the recording layer 3, probably applying pressure to that interface to deform the bottom and side walls of the groove. On recording, the substrate is rotated at a linear velocity of about 1.2 m/s to about 1.4 m/s.

This invention is applicable not only to close contact type optical recording media such as the illustrated one, but also to any optical recording medium having a dye-containing recording layer. Typical of such a medium is a pit formation type optical recording disc of the air sandwich structure. Similar benefits can be accomplished by applying this invention to such discs.

EXAMPLE

Examples of the present invention are given below together with comparative examples for explaining the invention in more detail.

Example 1

Polycarbonate was injection molded to obtain a substrate of 120 mm in diameter and 1.2 mm in thickness. On the surface of the substrate on which a recording layer was to be formed, there was provided a tracking groove having a groove pitch of 1.6 μm, a groove width of 0.42 μm and a groove depth of 1,550 Å.

On the resin substrate, a 0.3 wt % solution of dye B-1 in 2,2,3,3-tetrafluoropropanol was coated by spin coating and dried to form a dye film having a dry thickness of 600 Å in the groove ($t_B$) and 450 Å on the average. On this dye film, a 1.5 wt % solution of dye A-1 in methylcyclohexane was coated by spin coating and dried to form a dye film, yielding a recording layer of the two-layer laminate type.

The thickness (as-dried thickness) of the recording layer, when the two layers were combined, was 1,800 Å in the groove ($t_A+t_B$) and 1,500 Å on the average ($t_A/t_B=2$). Further, an Au reflective layer of 85 nm thick was formed on the recording layer by sputtering, and a protective layer (5 µm thick) of a UV-curing type acrylic resin was formed thereon. In this way, an optical recording disc as shown in FIG. 2 was obtained.

This disc sample was examined for write/read characteristics at a linear velocity of 1.4 m/s by means of a 780-nm semiconductor laser, finding an optimum recording power of 7.0 mW, a reflectance of the unrecorded disc of more than 70%, a degree of modulation of record signals of more than 60%, and a reflectance of record signals (Rtop) of 65%. Therefore, this disc was found to be an optical recording disc conforming to the Orange Book standard.

The disc which had been recorded at 780 nm was examined for read characteristics at a linear velocity of 1.4 m/s by means of a 635-nm semiconductor laser, finding a reflectance of 40% and a degree of modulation of 44%. An error rate of less than 10 errors/sec. was found when measurement was done in accordance with the C1 error of the Orange Book standard. This suggests that the disc which has been recorded at 780 nm can be satisfactorily read at 635 nm.

Inversely, the disc sample was examined for write/read characteristics at a linear velocity of 1.4 m/s by means of a 635-nm semiconductor laser, finding an optimum recording power of 7 mW, a reflectance of the unrecorded disc of 25%, a degree of modulation of record signals of 40%, and an Rtop of 23%. It was thus found that this disc was capable of satisfactory writing and reading at 635 nm.

The disc which had been recorded at 635 nm was examined for read characteristics at a linear velocity of 1.4 m/s by means of a 780-nm semiconductor laser, finding an Rtop of 65% and a degree of modulation of 60%. An error rate of less than 10 errors/sec. was found when the C1 error was measured. It was found that the disc was capable of satisfactory reading meeting the Orange Book standard.

It is noted that dye A-1 had n=2.2 and k=0.08 at 780 nm and the absorption spectrum of its thin film had a λmax of 724 nm and a half-value width of 130 nm as previously reported. Dye B-1 had n=2.3 and k=0.03 at 630 nm (as measured on a dye film of 80 nm thick) and a λmax of 570 nm.

Dye B-1 has a solubility at 25° C. of about 0.01 wt % at most in methylcyclohexane whereas dye A-1 has a solubility at 25° C. of about 0.02 wt % in 2,2,3,3-tetrafluoropropanol. When the solvents used in the respective coating solutions were exchanged, the dyes were substantially insoluble. Moreover, methylcyclohexane and 2,2,3,3-tetrafluoropropanol are immiscible as demonstrated by a solubility at 25° C. of methylcyclohexane in 2,2,3,3-tetrafluoropropanol of about 0.1 wt % at most.

Example 2

An optical recording disc was prepared and evaluated as in Example 1 except that dye B-1 was replaced by dye B-2 and dye A-1 replaced by dye A-2. The thickness (as-dried thickness) of the dye film of dye B-2 was 400 Å in the groove ($t_B$) and 300 Å on the average. The thickness (as-dried thickness) of the recording layer of the two layer structure was 1,500 Å in the groove ($t_A+t_B$) and 1,200 Å on the average ($t_A/t_B=2.75$).

This disc sample was examined for write/read characteristics at a linear velocity of 1.2 m/s by means of a 780-nm semiconductor laser, finding an optimum recording power of 6.9 mW, a reflectance of more than 70%, a degree of modulation of more than 60%, and an Rtop of 65%. Therefore, this disc was found to be an optical recording disc conforming to the Orange Book standard.

The disc which had been recorded at 780 nm was further examined for read characteristics at a linear velocity of 1.2 m/s by means of a 650-nm semiconductor laser, finding a reflectance of 35% and a degree of modulation of 40%. The error rate was found equivalent to that of Example 1. This suggests that the disc which has been recorded at 780 nm can be satisfactorily read at 650 nm.

Inversely, the disc sample was examined for write/read characteristics at a linear velocity of 1.2 m/s by means of a 650-nm semiconductor laser, finding an optimum recording power of 7.5 mW, a reflectance of the unrecorded disc of 28%, a degree of modulation of record signals of 42%, and an Rtop of 25%. It was thus found that this disc was capable of satisfactory writing and reading at 650 nm.

The disc which had been recorded at 650 nm was examined for read characteristics at a linear velocity of 1.2 m/s by means of a 780-nm semiconductor laser, finding an Rtop of 66% and a degree of modulation of 62%. An error rate of less than 10 errors/sec. was found when the C1 error was measured. It was found that the disc was capable of satisfactory reading meeting the Orange Book standard.

It is noted that dye A-2 had n=2.3 and k=0.05 at 780 nm and the absorption spectrum of its thin film had a λmax of 715 nm and a half-value width of 140 nm as previously reported. Dye B-2 had n=2.5 and k=0.18 at 650 nm (as measured on a dye film of 75 nm thick) and a λmax of 610 nm.

Dye B-2 has a solubility at 25° C. of about 0.01 wt % at most in methylcyclohexane whereas dye A-2 has a solubility at 25° C. of about 0.03 wt % in 2,2,3,3-tetrafluoropropanol.

Example 3

An optical recording disc was prepared and evaluated as in Example 1 except that dye B-1 was replaced by dye B-3 and dye A-1 replaced by dye A-3. The thickness (as-dried thickness) of the dye film of dye B-3 was 500 Å in the groove ($t_B$) and 400 Å on the average. The thickness (as-dried thickness) of the recording layer of the two layer structure was 2,000 Å in the groove ($t_A+t_B$) and 1,800 Å on the average ($t_A/t_B=3$).

This disc sample was examined by recording at a linear velocity of 4.8 m/s by means of a 780-nm semiconductor laser and reading at a linear velocity of 1.2 m/s, finding an optimum recording power of 12 mW, a reflectance of more than 70%, a degree of modulation of more than 60%, and an Rtop of 65%. Therefore, this disc was found to be an optical recording disc conforming to the Orange Book standard.

The disc which had been recorded at 780 nm was further examined for read characteristics at a linear velocity of 1.2 m/s by means of a 635-nm semiconductor laser, finding a reflectance of 45% and a degree of modulation of 40%. The error rate was found equivalent to that of Example 1. This suggests that the disc which has been recorded at 780 nm can be satisfactorily read at 635 nm.

Inversely, the disc sample was examined for write/read characteristics at a linear velocity of 1.2 m/s by means of a 635-nm semiconductor laser, finding an optimum recording power of 6 mW, a reflectance of the unrecorded disc of 30%, a degree of modulation of record signals of 45%, and an Rtop of 27%. It was thus found that this disc was capable of satisfactory writing and reading at 635 nm.

The disc which had been recorded at 635 nm was examined for read characteristics at a linear velocity of 1.2 m/s by means of a 780-nm semiconductor laser, finding an Rtop of 68% and a degree of modulation of 65%. An error rate of less than 10 errors/sec. was found when the C1 error was measured. It was found that the disc was capable of satisfactory reading meeting the Orange Book standard.

It is noted that dye A-3 had n=2.4 and k=0.10 at 780 nm and the absorption spectrum of its thin film had a $\lambda$max of 725 nm and a half-value width of 125 nm as previously reported. Dye B-3 had n=2.3 and k=0.05 at 630 nm (as measured on a dye film of 80 nm thick) and a $\lambda$max of 575 nm.

Dye B-3 has a solubility at 25° C. of about 0.01 wt % at most in methylcyclohexane whereas dye A-3 has a solubility at 25° C. of about 0.02 wt % in 2,2,3,3-tetrafluoropropanol.

Example 4

Polycarbonate was injection molded to obtain a substrate of 120 mm in diameter and 1.2 mm in thickness. On the surface of the substrate on which a recording layer was to be formed, there was provided a tracking groove having a groove pitch of 1.6 μm, a groove width of 0.42 μm and a groove depth of 1,200 Å.

On the resin substrate, a dye film was formed using a 1.5 wt % solution of dye A-1 in methylcyclohexane in accordance with a spin coating technique and dried. The thickness (as-dried thickness) of this dye film was 1,200 Å in the groove and 1,100 Å on the average. Thereafter, a dye film was formed using a 0.6 wt % solution of dye B-1 in 2,2,3,3-tetrafluoropropanol in accordance with a spin coating technique and dried, yielding a recording layer.

The thickness (as-dried thickness) of the recording layer, when the two layers were combined, was 2,200 Å in the groove and 1,800 Å on the average. Further, an Au reflective layer of 85 nm thick was formed on the recording layer by sputtering, and a protective layer (5 μm thick) of a UV-curing type acrylic resin was formed thereon. In this way, an optical recording disc as shown in FIG. 2 was obtained.

This disc sample was examined for write/read characteristics at a linear velocity of 1.2 m/s by means of a 780-nm semiconductor laser, finding an optimum recording power of 7.3 mW, a reflectance of the unrecorded disc of more than 70%, a degree of modulation of record signals of more than 60%, and a reflectance of record signals (Rtop) of 65%. Therefore, this disc was found to be an optical recording disc conforming to the Orange Book standard.

The disc was examined for read characteristics at a linear velocity of 1.2 m/s by means of a 635-nm semiconductor laser, finding a reflectance of 40% and a degree of modulation of 48%. The error rate was found equivalent to that of Example 1. This suggests that the disc which has been recorded at 780 nm can be satisfactorily read at 635 nm.

Inversely, the disc sample was examined for write/read characteristics at a linear velocity of 1.2 m/s by means of a 635-nm semiconductor laser, finding an optimum recording power of 5.5 mW, a reflectance of the unrecorded disc of 35%, a degree of modulation of record signals of 40%, and an Rtop of 32%. It was thus found that this disc was capable of satisfactory writing and reading at 635 nm.

The disc which had been recorded at 635 nm was examined for read characteristics at a linear velocity of 1.2 m/s by means of a 780-nm semiconductor laser, finding an Rtop of 68% and a degree of modulation of 60%. An error rate of less than 10 errors/sec. was found when the C1 error was measured. It was found that the disc was capable of satisfactory reading meeting the Orange Book standard.

It is evident that when the order of stacking a dye film of dye A and a dye film of dye B was reversed from that of Example 1, no practical problems arose, but characteristics were slightly inferior to those of Example 1.

Example 5

Disc samples were prepared and evaluated as in Example 1 except that dye A-4, A-5, A-7, A-8, A-9, A-13, A-27, A-28 or A-24 was used instead of dye A-1, with the results being equivalent to the sample of Example 1.

Example 6

Disc samples were prepared and evaluated as in Example 2 except that dyes A-19 or A-34 was used instead of dye A-2, with the results being equivalent to the sample of Example 2.

Example 7

Disc samples were prepared and evaluated as in Example 3 except that dye A-4, A-5, A-7, A-8, A-9, A-13, A-27, A-28 or A-24 was used instead of dye A-3, with the results being equivalent to the sample of Example 3.

Example 8

Disc samples were prepared and evaluated as in Example 4 except that dye A-4, A-5, A-7, A-8, A-9, A-13, A-27, A-28 or A-24 was used instead of dye A-1, with the results being equivalent to the sample of Example 4.

Comparative Example 1

A disc was prepared and evaluated for characteristics as in Example 1 except that the recording layer consisted solely of a dye film of dye A-1 and its thickness was the same as the total thickness. On evaluation at 780 nm, there were found an optimum recording power of 7.3 mW, a reflectance of 72%, a degree of modulation of 65%, and an Rtop of 67%. Therefore, this disc was found to be an optical recording disc conforming to the Orange Book standard.

Next, the disc was evaluated at 635 nm as in Example 1. Read characteristics were examined at a linear velocity of 1.4 m/s to find a reflectance of 20% and a degree of modulation of 10%. An error rate of more than 10 errors/sec. was found when measurement was done in accordance with the C1 error of the Orange Book standard. The disc which had been recorded at 780 nm could not be read at 635 nm.

On the other hand, no satisfactory signals were obtained from recording at 635 nm even when the recording power was 7 mW.

Comparative Example 2

A disc was prepared and evaluated for characteristics as in Example 1 except that the recording layer consisted solely of a dye film of dye B-1 and its thickness was the same as the total thickness. Evaluation at 780 nm was impossible because no signals could be recorded even when a recording power of 12 mW was applied.

On the other hand, write/read characteristics at 635 nm were substantially equivalent to the disc sample of Example 1 although the disc which had been recorded at 635 nm could not be read at 780 nm.

Comparative Example 3

An optical recording disc was prepared and evaluated for characteristics as in Example 1 except that the dye film of dye A-1 in the recording layer was replaced by a dye film of dye A-23 combined with dye P-1 shown below. On evaluation at 780 nm, there were found an optimum recording power of 7.5 mW, a reflectance of 66%, a degree of modulation of 65%, and an Rtop of 65%. Therefore, this disc was found to be an optical recording disc conforming to the Orange Book standard.

Next, the disc was evaluated at 635 nm as in Example 1. Read characteristics were examined at a linear velocity of 1.4 m/s to find a reflectance of 10%, which means that no signals could be read.

On the other hand, write/read characteristics at 635 nm were examined at a linear velocity of 1.4 m/s to find that no signals could be taken out despite a recording power of 5 mW and a reflectance of the unrecorded disc of 11%.

Comparative Example 4

An attempt was made to fabricate an optical recording disc by following the procedure of Example 1 except that the dye film of dye A-1 in the recording layer was replaced by a dye film of pentamethinecyanine dye C-1 shown below. A coating solution of pentamethinecyanine dye C-1 could not be prepared since that dye was insoluble in methylcyclohexane. An optical recording disc having a recording layer of the laminate type could not be fabricated. It was virtually impossible to find a solvent which is immiscible with the solvent for dye B-1 and in which pentamethinecyanine dye C-1 is soluble.

Consequently, 2,2,3,3-tetrafluoropropanol was used as a common coating solvent for both the dyes, and more specifically, the coating solution for dye B-1 was a 0.3 wt % solution as in Example 1 and the coating solution for pentamethinecyanine dye C-1 was a 1.5 wt % solution. Using these coating solutions, an attempt was made to apply dye films one on top of the other as in Example 1. This resulted in a dye film of a mixture of both the dyes.

The thus fabricated optical recording disc was evaluated for characteristics. On evaluation at 780 nm, there were found an optimum recording power of 6 mW, a reflectance of 68%, a degree of modulation of 75%, and an Rtop of 68%. This disc was found to be an optical recording disc conforming to the Orange Book standard.

Dye P-1

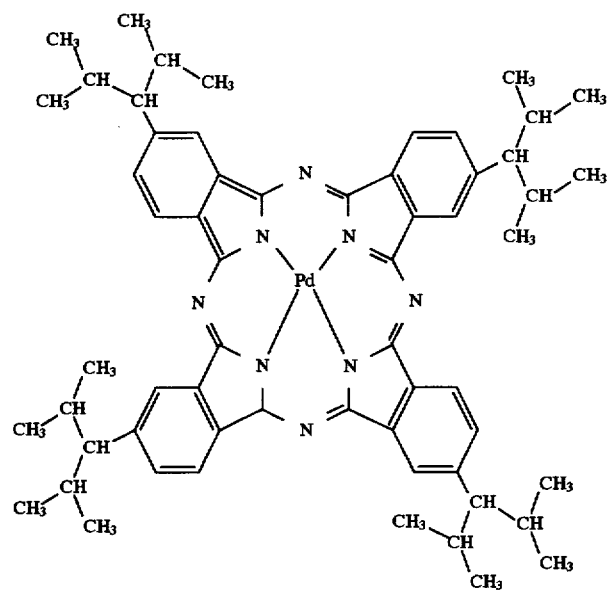

It is noted that the dye film containing the two phthalocyanine dyes used herein had n=2.0 and k=0.07 at 780 nm (as measured on a dye film of 70 nm thick by the same procedure as described previously) (dye A-23: n=2.2, k=0.13; dye P-1: n=1.9, k=0.02). The absorption spectrum of its thin film had a half-value width of 180 nm (as measured on a dye film of 80 nm thick by the same procedure as described previously). In the dye film, the mixing ratio (weight ratio) of dye A-23 to dye P-1, dye A-23/dye P-1, was equal to 1. The mixture of these dyes had a solubility at 25° C. of 0.02 wt % in 2,2,3,3-tetrafluoropropanol.

Next, the disc was evaluated at 635 nm as in Example 1. Read characteristics were examined at a linear velocity of 1.4 m/s to find a reflectance of 13%, which means that no signals could be read.

On the other hand, write/read characteristics at 635 nm were examined at a linear velocity of 1.4 m/s to find insufficient characteristics as demonstrated by a recording power of 4 mW and a reflectance of the unrecorded disc of 15%, a degree of modulation of record signal of 50%, and a Rtop of 13%.

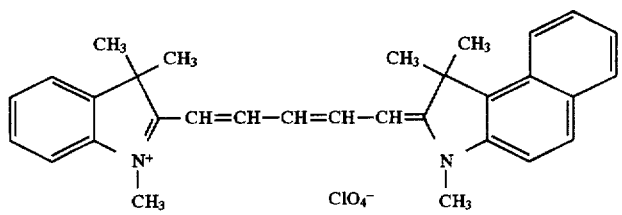

Dye C-1

It is noted that pentamethinecyanine dye C-1 had n=2.45 and k=0.05 at 780 nm (as measured on a dye film of 75 nm thick by the same procedure as described previously). The absorption spectrum of its thin film had a half-value width of 185 nm (as measured on a dye film of 80 nm thick by the same procedure as described previously).

Example 9

A 0.2 wt % solution of dye B-4 in 2,2,3,3-tetrafluoropropanol was coated on a polycarbonate substrate as used in Example 1 by spin coating and dried into a dye film having a dry thickness of 300 Å in the groove ($t_B$) and 250 Å on the average. On this dye film, a 2.0 wt % solution of dye A-3 in ethylcyclohexane was coated by spin coating and dried into a dye film having a dry thickness of 1,000 Å in the groove ($t_A$) and 800 Å on the average, yielding a recording layer of the two-layer laminate type ($t_A/t_B$=3.3).

Thereafter, an optical recording disc was prepared as in Example 1. This is designated sample No. 1. It is noted that dye B-4 had n=2.5 and k=0.09 at 650 nm (as measured on a dye film of 80 nm thick) and $\lambda$max of 612 nm.

A disc was prepared as sample No. 1 except that a 0.2 wt % solution of dye B-2 in 2,2,3,3-tetrafluoropropanol and a 2.0 wt % solution of dye A-3 in ethylcyclohexane were used, and a dye film of dye A-3 (dry thickness: 900 Å in the groove and 750 Å on the average) was formed on a dye film of dye B-2 (dry thickness: 250 Å in the groove ($t_B$) and 200 Å on the average) to produce a recording layer of the two-layer laminate type ($t_A/t_B$=3.6). This is designated sample No. 2.

Sample No. 1 was changed such that the dye film of dye B-4 had a thickness of 750 Å in the groove ($t_B$) and 600 Å on the average and the dye film of dye A-3 had a thickness of 500 Å in the groove ($t_A$) and 380 Å on the average ($t_A/t_B$=0.67). This is designated sample No. 3.

Dyes B-2 and B-4 each had a solubility at 25° C. of about 0.01 wt % at most in ethylcyclohexane whereas dye A-3 had a solubility at 25° C. of about 0.02 wt % at most in 2,2,3,3-tetrafluoropropanol. When the solvents used in the respective coating solutions were exchanged, the dyes were substantially insoluble. Moreover, ethylcyclohexane and 2,2,3,3-tetrafluoropropanol are immiscible as demonstrated by a solubility at 25° C. of ethylcyclohexane in 2,2,3,3-tetrafluoropropanol of about 0.1 wt % at most.

In the thus prepared optical recording discs, sample Nos. 1 to 3, EFM-CD format signals were recorded at a linear velocity of 1.2 m/s using a laser having an oscillation wavelength of 780 nm whereupon an optimum recording power (PO), reflectance (Rtop), degree of modulation (I11Mod), and jitter were measured. Also with a tester at a laser wavelength of 650 nm, Rtop and I11Mod were measured. The results are shown in Table 6.

TABLE 6

| Sample No. | $t_A/t_B$ | PO (mW) | 780 nm Rtop (%) | 780 nm I11Mod (%) | Jitter (ns) | 650 nm Rtop (%) | 650 nm I11Mod (%) |
|---|---|---|---|---|---|---|---|
| 1 | 3.3 | 6.0 | 68.5 | 65.0 | 19 | 32.0 | 55.5 |
| 2 | 3.6 | 5.8 | 69.0 | 63.5 | 22 | 28.5 | 64.0 |
| 3 | 0.67 | 7.5 | 62.0 | 55.0 | 45 | 40.0 | 25.0 |

It is evident from Table 6 that sample Nos. 1 and 2 having $t_A/t_B$ within the preferred range according to the invention are optical recording discs conforming to the Orange Book standard and exhibit sufficient characteristics at 650 nm to satisfy Rtop×I11Mod>0.12. In contrast, sample No. 3 wherein $t_A/t_B$<1 exhibits inferior characteristics to sample Nos. 1 and 2. It is noted that reading at 650 nm becomes difficult as $t_A/t_B$ increases beyond the preferred range according to the invention.

Example 10

Sample No. 11 was fabricated as sample No. 1 in Example 9 except that a 0.3 wt % solution of a mixture of dye B-4 and quencher Q-1 shown below in a B-4:Q-1 ratio of 85:15 on a weight basis in 2,2,3,3-tetrafluoropropanol was used to form a dye film (dry thickness: 400 Å in the groove ($t_B$) and 300 Å on the average), and a dye film of dye A-3 (dry thickness: 800 Å in the groove ($t_A$) and 650 Å on the average) was formed on that dye film to produce a recording layer of the two-layer laminate type ($t_A/t_B$=2).

Sample No. 12 was fabricated as sample No. 2 in Example 9 except that a 0.3 wt % solution of a mixture of dye B-2 and quencher Q-1 shown below in a B-2:Q-1 ratio of 80:20 on a weight basis in 2,2,3,3-tetrafluoropropanol was used to form a dye film (dry thickness: 300 Å in the groove ($t_B$) and 250 Å on the average), and a dye film of dye A-3 (dry thickness: 900 Å in the groove ($t_A$) and 750 Å on the average) was formed on that dye film to produce a recording layer of the two-layer laminate type ($t_A/t_B$=3).

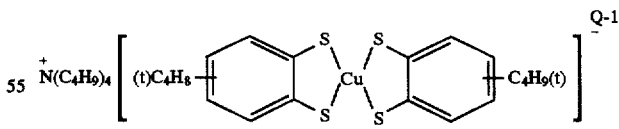

Sample Nos. 11 and 12 were examined for characteristics as in Example 9, finding that they exhibited not only satisfactory characteristics equivalent to sample Nos. 1 and 2, but also improved light resistance.

Example 11

Polycarbonate was injection molded to obtain a substrate of 120 mm in diameter and 1.2 mm in thickness. On the surface of the substrate on which a recording layer was to be formed, there was provided a tracking groove having a groove pitch of 1.6 μm, a groove width of 0.42 μm and a groove depth of 1,550 Å.

On the resin substrate, a 0.5 wt % solution of a mixture of cyanine dye B-4 and metal-containing azo compound No. I-1 in a weight ratio of 1:1 in 2-ethoxyethanol was coated by spin coating and dried to form a dye film having a dry thickness of 600 Å in the groove ($t_B$) and 450 Å on the average. On this dye film, a 1.5 wt % solution of dye A-3 in ethylcyclohexane was coated by spin coating and dried to form a dye film, yielding a recording layer of the two-layer laminate type.

The thickness (as-dried thickness) of the recording layer, when the two layers were combined, was 1,800 Å in the groove ($t_A+t_B$) and 1,500 Å on the average ($t_A/t_B=2$). Further, an Au reflective layer of 85 nm thick was formed on the recording layer by sputtering, and a protective layer (5 μm thick) of a UV-curing type acrylic resin was formed thereon. In this way, an optical recording disc as shown in FIG. 2 was obtained.

This disc sample was examined for write/read characteristics at a linear velocity of 1.4 m/s by means of a 780-nm semiconductor laser, finding an optimum recording power of 7.4 mW, a reflectance of the unrecorded disc of more than 70%, a degree of modulation of record signals of more than 60%, and a reflectance of record signals (Rtop) of 65%. Therefore, this disc was found to be an optical recording disc conforming to the Orange Book standard.

The disc which had been recorded at 780 nm was examined for read characteristics at a linear velocity of 1.4 m/s by means of a 650-nm semiconductor laser, finding a reflectance of 38% and a degree of modulation of 45%. An error rate of less than 10 errors/sec. was found when measurement was done in accordance with the C1 error of the Orange Book standard. This suggests that the disc which has been recorded at 780 nm can be satisfactorily read at 650 nm.

Inversely, the disc sample was examined for write/read characteristics at a linear velocity of 1.4 m/s by means of a 650-nm laser, finding an optimum recording power of 7 mW, a reflectance of the unrecorded disc of 25%, a degree of modulation of record signals of 40%, and an Rtop of 23%. It was thus found that this disc was capable of satisfactory writing and reading at 650 nm.

The disc which had been recorded at 650 nm was examined for read characteristics at a linear velocity of 1.4 m/s by means of a 780-nm semiconductor laser, finding an Rtop of 65% and a degree of modulation of 60%. An error rate of less than 10 errors/sec. was found when the C1 error was measured. It was found that the disc was capable of satisfactory reading meeting the Orange Book standard.

It was also found that light resistance was improved using compound No. I-1. The extent of improvement was greater than that achieved using the above-mentioned metal complex quencher Q-1.

It is noted that compound No. I-1 had a λmax of 610 nm as measured on a thin film sample of 50 nm thick and n=2.10 and k=0.040 at 650 nm as measured by the above-mentioned procedure.

Dye B-4 and compound No. I-1 have a solubility at 25° C. of about 0.01 wt % at most in ethylcyclohexane. Moreover, ethylcyclohexane and 2-ethoxyethanol are immiscible as demonstrated by a solubility at 25° C. of ethylcyclohexane in 2-ethoxyethanol of about 0.1 wt % at most.

Example 12

A 0.6 wt % solution of metal-containing azo compound No. I-1 and cyanine dye B-5 in a weight ratio of 1:1 in 2-ethoxyethanol was applied onto a polycarbonate resin substrate of 120 mm in diameter and 1.2 mm in thickness which was pre-grooved (depth 0.14 μm, width 0.50 μm, and groove pitch 1.6 μm) by spin coating and dried at 60° C. for 3 hours, forming a lower recording layer (recording layer B) having a thickness of 500 Å on the average (in-groove thickness $t_B=600$ Å).

A 2.0 wt % solution of phthalocyanine dye A-44 in ethylcyclohexane was applied onto the lower recording layer by spin coating and dried at 60° C. for 3 hours, forming an upper recording layer (recording layer A) having a thickness of 1,000 Å on the average (in-groove thickness $t_A=1,250$ Å) ($t_A/t_B=2.1$).

Further an Au reflective layer of 850 Å thick was formed on the recording layer of two-layer structure by sputtering, and a coating (5 μm thick) of a UV-curing type acrylic resin was formed thereon as a protective layer.

It is noted that phthalocyanine dye A-44 had a λmax of 728 nm, a half-value width of 140 nm, n=2.2 and k=0.09 as measured on a thin film sample of 80 nm thick.

It is also noted that cyanine dye B-5 had a λmax of 611 nm as measured on a thin film sample of 80 nm thick and n=2.45 and k=0.09 at 650 nm as measured by the above-mentioned procedure. The solubility at 25° C. of cyanine dye B-5 in ethylcyclohexane was about 0.01 wt % at most.

The thus prepared disc sample was recorded at a linear velocity of 1.2 m/s using a laser having an oscillation wavelength of 780 nm and read using the laser having an oscillation wavelength of 780 nm and a laser having an oscillation wavelength of 650 nm. The optimum recording power (PO), degree of modulation (I11Mod), and reflectance (Rtop) were measured.

The disc was irradiated with a xenon lamp (Xenon Fadeometer manufactured by Shimazu Mfg. K.K.) at 80,000 lux for 200 hours. Changes of modulation (I11Mod) and reflectance (Rtop) after exposure were determined.

The results are shown below.

|  | Initial | After exposure |
|---|---|---|
| Evaluation using a laser with oscillation wavelength 780 nm | | |
| Rtop | 74% | 74% |
| I11Mod | 66% | 66% |
| PO | 7.0 mW | |
| Evaluation using a laser with oscillation wavelength 650 nm | | |
| Rtop | 30% | 30% |
| I11Mod | 62% | 62% |

This disc sample had fully satisfactory characteristics as CD-RII and excellent light stability. It was also found that the use of the above-mentioned metal-containing azo compound improves light deterioration of a cyanine dye. The extent of improvement was greater than that achieved using the above-mentioned metal complex quencher Q-1.

Example 13

Polycarbonate was injection molded to obtain a substrate of 120 mm in diameter and 1.2 mm in thickness. On the surface of the substrate on which a recording layer was to be formed, there was provided a tracking groove having a groove pitch of 1.6 μm, a groove width of 0.42 μm and a groove depth of 1,550 Å.

Using a 0.5 wt % solution of compound No. 38 in 2-ethoxyethanol, a lower recording layer (recording layer B:

dry thickness of 750 Å in the groove ($t_B$) and 650 Å on the average) was formed by spin coating. A coating of SiO₂ of 200 Å thick was sputtered thereon as an intermediate layer. Using a 1.5 wt % solution of dye A-3 in ethylcyclohexane, an upper recording layer (recording layer A: dry thickness of 1,500 Å in the groove ($t_A$) and 1,350 Å on the average) was formed on the intermediate layer by spin coating. In this way, there was completed a recording layer of the two-layer laminate type with an intermediate layer interposed therebetween ($t_A/t_B=2$). Further an Au reflective layer of 85 nm thick was formed on the recording layer by sputtering, and a protective coating (5 μm thick) of a UV-curing type acrylic resin was formed thereon. An optical recording disc as shown in FIG. 2 was obtained in this way.

This disc sample was examined for write/read characteristics at a linear velocity of 1.4 m/s by means of a 780-nm semiconductor laser, finding an optimum recording power of 6.5 mW, a reflectance of the unrecorded disc of more than 70%, a degree of modulation of record signals of more than 60%, and a reflectance of record signals (Rtop) of 65%. Therefore, this disc was found to be an optical recording disc conforming to the Orange Book standard.

The disc which had been recorded at 780 nm was examined for read characteristics at a linear velocity of 1.4 m/s by means of a 650-nm semiconductor laser, finding a reflectance of 42% and a degree of modulation of 44%. An error rate of less than 10 errors/sec. was found when measurement was done in accordance with the C1 error of the Orange Book standard. This suggests that the disc which has been recorded at 780 nm can be satisfactorily read at 650 nm.

Inversely, the disc sample was examined for write/read characteristics at a linear velocity of 1.4 m/s by means of a 650-nm laser, finding an optimum recording power of 5 mW, a degree of modulation of record signals of 45%, and an Rtop of 53%. It was thus found that this disc was capable of satisfactory writing and reading at 650 nm.

The disc which had been recorded at 650 nm was examined for read characteristics at a linear velocity of 1.4 m/s by means of a 780-nm semiconductor laser, finding an Rtop of 66% and a degree of modulation of 70%. An error rate of less than 10 errors/sec. was found when the C1 error was measured. It was found that the disc was capable of satisfactory reading meeting the Orange Book standard.

It is noted that with respect to λmax and n and k at 650 nm (as measured on a thin film sample of 80 nm thick), sub-phthalocyanine boron complex compound No. 38 had a λmax of 610 nm, n=2.3 and k=0.14.

It was found that since compound No. 38 was soluble in ethylcyclohexane, there was formed a mix film of compound No. 38 with phthalocyanine dye A-3 unless the intermediate layer was provided.

We claim:

1. An optical recording medium comprising at least two recording layers containing a dye on a substrate and a reflective layer thereon, comprising:

at least two layers of said recording layers have different optical constants, and at least one among said recording layers having different optical constants contains a dye which forms a thin film having an absorption spectrum with a half-value width up to 170 nm;

among said recording layers having different optical constants, at least one layer contains a dye A having a complex index of refraction at 780 nm with a real part n 1.8 to 2.8 and an imaginary part k up to 0.15 and forming a thin film having an absorption spectrum with a half-value width up to 170 nm and at least one distinct layer contains a dye B having a complex index of refraction at 630 nm or 650 nm with a real part n 1.8 to 2.8 and the imaginary part k is up to 0.4;

said dye B is a trimethinecyanine dye of the following formula:

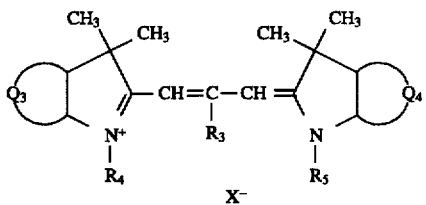

wherein

X⁻ is a monovalent anion;

each of $Q_3$ and $Q_4$ is a group of atoms necessary to complete an indolenine or benzoindolenine ring with the pyrrole ring, the rings completed by $Q_3$ and $Q_4$ may be the same or different; and $R_3$ is a hydrogen atom or monovalent substituent; each of $R_4$ and $R_5$ is an alkyl radical.

2. The optical recording medium of claim 1 wherein either one of the rings completed by $Q_3$ and $Q_4$ together with the pyrrole rings is an indolenine ring and the other is a benzoindolenine ring, and the benzene ring of the benzoindolenine ring is fused to the indolenine ring at the 4 and 5-positions thereof.

3. The optical recording medium of claim 2 wherein the indolenine ring has a hydrogen atom, halogen atom or alkyl radical at the 5-position thereof.

4. The optical recording medium of claim 1 wherein both the rings completed by $Q_3$ and $Q_4$ together with the pyrrole rings are benzoindolenine rings, and the benzene ring of each benzoindolenine ring is fused to the indolenine ring at the 4 and 5-positions thereof.

5. An optical recording medium comprising at least two recording layers containing a dye on a substrate and a reflective layer thereon, comprising:

at least two layers of said recording layers have different optical constants, and at least one among said recording layers having different optical constants contains a dye which forms a thin film having an absorption spectrum with a half-value width up to 170 nm.;

among said recording layers having different optical constants, at least one layer contains a dye A having a complex index of refraction at 780 nm with a real part n 1.8 to 2.8 and an imaginary part k up to 0.15 and forming a thin film having an absorption spectrum with a half-value width up to 170 nm and at least one distinct layer contains a dye B having a complex index of refraction at 630 nm or 650 nm with a real part n 1.8 to 2.8 and an imaginary part k up to 0.4;

said dye B is a trimethinecyanine dye of the following formula:

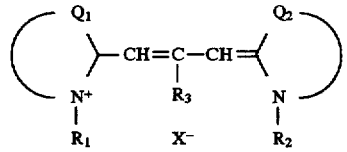

wherein each of $Q_1$ and $Q_2$ is a group of atoms necessary to complete a heterocyclic ring with the carbon and nitrogen atoms, the heterocyclic skeletons completed by $Q_1$ and $Q_2$ may be the same or different;

each of $R_1$ and $R_2$, which may be the same or different, is an aliphatic hydrocarbon radical, $R_3$, is a hydrogen atom or monovalent substituent;

$X^-$ is a monovalent anion; and wherein a singlet oxygen quencher is used as a stabilizer along with said trimethinecyanine dye.

6. The optical recording medium of claim 5 wherein said singlet oxygen quencher is a metal-containing azo compound of the following formula (IV):

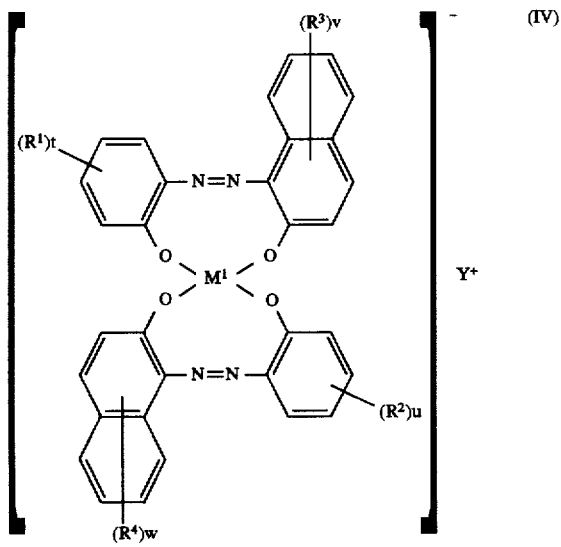

wherein each of $R^1$ and $R^2$ is selected from the group consisting of a nitro radical, halogen atom, amino radical, sulfamoyl radical, alkyl radical, and alkoxy radical, t and u each are 0 or an integer of 1 to 4, each of $R^3$ and $R^4$ is selected from the group consisting of a halogen atom, nitro radical, alkyl radical, alkoxy radical, and amino radical, v and w each are 0 or an integer of 1 to 6, $M^1$ is cobalt or nickel, and $Y^+$ is an alkyl-substituted ammonium ion, with the proviso that t, u, v and w are not equal to 0 at the same time, and the sum of t+u+v+w is 1 to 20.

7. The optical recording medium of claim 6 wherein said trimethinecyanine dye and said metal-containing azo compound are mixed and the mixing ratio of said metal-containing azo compound to said trimethinecyanine dye is from 10/90 to 95/5 on a molar basis.

8. An optical recording medium comprising at least two recording layers containing a dye on a substrate and a reflective layer thereon, comprising:

at least two layers of said recording layers have different optical constants, and at least one among said recording layers having different optical constants contains a dye which forms a thin film having an absorption spectrum with a half-value width up to 170 nm.;

among said recording layers having different optical constants, at least one layer contains a dye A having a complex index of refraction at 780 nm with a real part n 1.8 to 2.8 and an imaginary part k up to 0.15 and forming a thin film having an absorption spectrum with a half-value width up to 170 nm and at least one distinct layer contains a dye B having a complex index of refraction at 630 nm or 650 nm with a real part n 1.8 to 2.8 and an imaginary part k up to 0.4;

said dye B is a sub-phthalocyanine boron complex of the following formula:

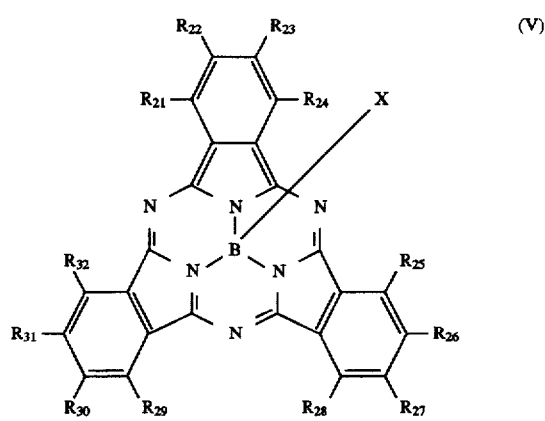

wherein each of $R_{21}$, $R_{22}$, $R_{23}$, $R_{24}$, $R_{25}$, $R_{26}$, $R_{27}$, $R_{28}$, $R_{29}$, $R_{30}$, $R_{31}$, and $R_{32}$, which may be the same or different, is selected from the group consisting of a hydrogen atom, halogen atom, alkyl, alkoxy, alkylthio, aryloxy, and arylthio radical, $R_{21}$ and $R_{22}$, $R_{22}$ and $R_{23}$, $R_{23}$ and $R_{24}$, $R_{25}$ and $R_{26}$, $R_{26}$ and $R_{27}$, $R_{27}$ and $R_{28}$, $R_{29}$ and $R_{30}$, $R_{30}$ and $R_{31}$, $R_{31}$ and $R_{32}$, taken together, each may form a fused ring, and X is selected from the group consisting of a halogen atom, hydroxyl, alkoxy, phenoxy and phenyl radical, and the recording layer A is formed on the recording layer B with an intermediate layer interleaved therebetween.

9. The optical recording medium of claim 8 wherein at least one of $R_{21}$ to $R_{32}$ is selected from the group consisting of a halogen atom, alkyl, alkoxy, alkylthio, aryloxy, and arylthio radical.

10. The optical recording medium of claim 8 wherein at least one of $R_{21}$ to $R_{32}$ is selected from the group consisting of a branched alkyl radical, alkoxy radical having a branched alkyl radical, cyclohexyloxy radical having a normal or branched alkyl radical, and alkyl-substituted phenoxy radical.

\* \* \* \* \*